(12) United States Patent
Bryant

(10) Patent No.: US 6,488,295 B1
(45) Date of Patent: Dec. 3, 2002

(54) STABLE AND MANEUVERABLE TWO-WHEELED VEHICLE

(76) Inventor: Robert H. Bryant, 5051 116th Ave. SE., Bellevue, WA (US) 98006

( * ) Notice: Subject to any disclaimer, the term of this patent is extended or adjusted under 35 U.S.C. 154(b) by 0 days.

(21) Appl. No.: 09/848,788

(22) Filed: May 3, 2001

(51) Int. Cl.[7] .............................. B60M 1/00

(52) U.S. Cl. ..................... 280/87.042; 280/87.041

(58) Field of Search ............ 280/87.041, 87.042, 280/11.27, 11.28, 7.15, 11.115, 87.043, 22.1

(56) References Cited

U.S. PATENT DOCUMENTS

| | | | | |
|---|---|---|---|---|
| 2,474,946 A | * | 7/1949 | Kinslow | 280/87.042 |
| 3,620,547 A | * | 11/1971 | Vaverek | 280/87.042 |
| 3,876,217 A | * | 4/1975 | Copier | 280/11.225 |
| 4,054,297 A | * | 10/1977 | Solimine | 280/11.28 |
| 4,093,252 A | * | 6/1978 | Rue | 280/87.042 |
| 4,094,524 A | | 6/1978 | Carroll | |
| 4,133,546 A | | 1/1979 | Rosenblum | |
| 4,181,316 A | | 1/1980 | Brand et al. | |
| 4,183,546 A | | 1/1980 | Heilig | |
| 4,202,559 A | | 5/1980 | Piazza, Jr. | |
| 4,230,330 A | | 10/1980 | Muhammad | |
| 4,234,204 A | | 11/1980 | Tibbals | |
| 4,245,848 A | | 1/1981 | Dudouyt | |
| 4,274,647 A | | 6/1981 | Drake, Jr. | |
| 4,336,952 A | | 6/1982 | Rochman | |

(List continued on next page.)

FOREIGN PATENT DOCUMENTS

DE 4311687 A1 * 8/1993 ........... A63C/17/04

OTHER PUBLICATIONS

David Wilson and Frank Whitt, Chapter 2 "Balancing and Steering," Bicycling Science (2nd Edition, 9th Printing, 1995), MIT, Cambridge.

Louis S. Bloomfield, "It's like riding a bike; the physics of two–wheelers," Seattle Times, Aug. 3, 1999, Seattle Times Company, Seattle.

Author Unknown, Internet Web Pages printed on Aug. 31, 2000 and Sep. 2, 2000, "Welcome to the world of dirtsurfing," from: www.dirtsurfer.com.

Author Unknown, Internet Web Pages printed on Aug. 31, 2000, Photographs of two–wheeled vehicles, from: www.grassboard.com.

John Forester, "Report on Stability of the Da Hon Bicycle," Dated: Nov. 19, 1989, Printed from an Internet Web Page on Jan. 4, 1999.

Primary Examiner—Brian L Johnson
Assistant Examiner—Kelly E Campbell
(74) Attorney, Agent, or Firm—Ipsolon LLP

(57) ABSTRACT

A two-wheeled vehicle, with the wheels mounted in an in-line fashion, that maintains the point of contact of the wheels in an optimal controllability area during both straight and turning operations, thereby expanding the controllable operating envelope of the vehicle to be substantially coincident with the overall operating envelope of the vehicle. Preferably, this is accomplished with position regulator, such as a dynamically-variable linkage (DVL), connecting one or more of the wheels to the chassis of the vehicle. The position regulator permits a rider to reliably and easily control and maneuver throughout the operating envelope of the vehicle simply by tilting the vehicle. As a result, stable, hands-free maneuvering of the vehicle is possible simply by tilting the base in the direction of a desired turn, even over rough terrain, and without a user requiring excessive corrective force or unusually special balancing skills. A plurality of such position regulators can be installed on the vehicle to further enhance stability and performance of the vehicle. Also, the vehicle may be powered or de-powered, and can include additional suspension systems aimed at smoothing the vehicle's ride.

40 Claims, 12 Drawing Sheets

U.S. PATENT DOCUMENTS

| | | | |
|---|---|---|---|
| 4,384,731 A | | 5/1983 | Webb |
| 4,582,342 A | | 4/1986 | Lew et al. |
| 4,681,333 A | * | 7/1987 | Rouge et al. ............ 280/11.28 |
| 4,744,576 A | | 5/1988 | Scollan, Jr. |
| 4,795,181 A | | 1/1989 | Armstrong |
| 4,943,075 A | | 7/1990 | Gates |
| 4,991,861 A | * | 2/1991 | Carn et al. ............ 280/11.208 |
| 5,029,887 A | | 7/1991 | Grutzner et al. |
| 5,046,747 A | | 9/1991 | Nielson, Jr. |
| 5,125,687 A | | 6/1992 | Hwang |
| 5,154,436 A | | 10/1992 | Jez et al. |
| 5,160,155 A | * | 11/1992 | Barachet ............... 280/11.209 |
| 5,165,710 A | | 11/1992 | Runyon |
| 5,251,934 A | | 10/1993 | Gates |
| 5,267,743 A | | 12/1993 | Smisek |
| D343,424 S | | 1/1994 | Lamb et al. |
| 5,382,052 A | | 1/1995 | Tarng |
| 5,419,570 A | | 5/1995 | Bollette |
| 5,458,351 A | | 10/1995 | Yu |
| 5,474,314 A | | 12/1995 | Lehman |
| 5,549,331 A | | 8/1996 | Yun et al. |
| 5,551,717 A | | 9/1996 | De Courcey Milne |
| 5,553,874 A | | 9/1996 | Schouten et al. |
| 5,560,625 A | | 10/1996 | Kuykendall |
| 5,566,956 A | | 10/1996 | Wang |
| 5,601,299 A | | 2/1997 | Yun et al. |
| 5,645,291 A | | 7/1997 | Ramage |
| 5,660,401 A | | 8/1997 | Yi |
| 5,707,068 A | | 1/1998 | Bradfield |
| 5,794,955 A | | 8/1998 | Flynn |
| D398,358 S | | 9/1998 | Jeffreys |
| D399,902 S | | 10/1998 | Lee |
| 5,826,895 A | | 10/1998 | Bradfield |
| 5,833,252 A | | 11/1998 | Strand |
| 5,855,385 A | | 1/1999 | Hambsch |
| 5,860,657 A | * | 1/1999 | Kroher .................. 280/11.223 |
| 5,868,408 A | * | 2/1999 | Miller .................... 280/11.28 |
| 5,924,710 A | | 7/1999 | De Courcey Milne |
| 5,927,732 A | | 7/1999 | Snyder |
| 5,927,735 A | * | 7/1999 | Hosoda ...................... 180/181 |
| 5,950,754 A | | 9/1999 | Ondrish, Jr. |
| 5,954,349 A | * | 9/1999 | Rutzel ....................... 280/100 |
| 5,984,328 A | | 11/1999 | Tipton |
| 5,992,865 A | | 11/1999 | Vargas |
| 5,997,018 A | * | 12/1999 | Lee ......................... 280/11.28 |

* cited by examiner

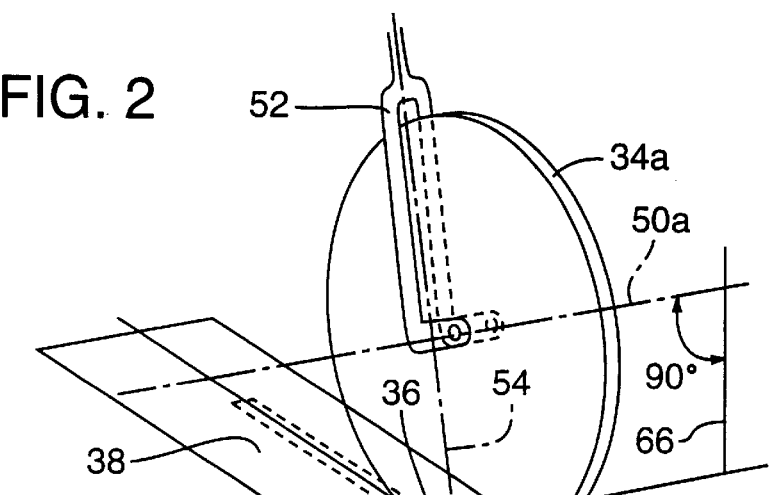
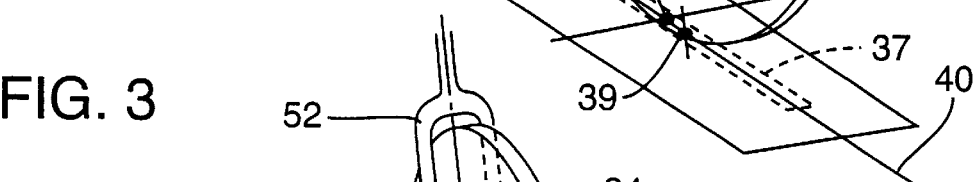
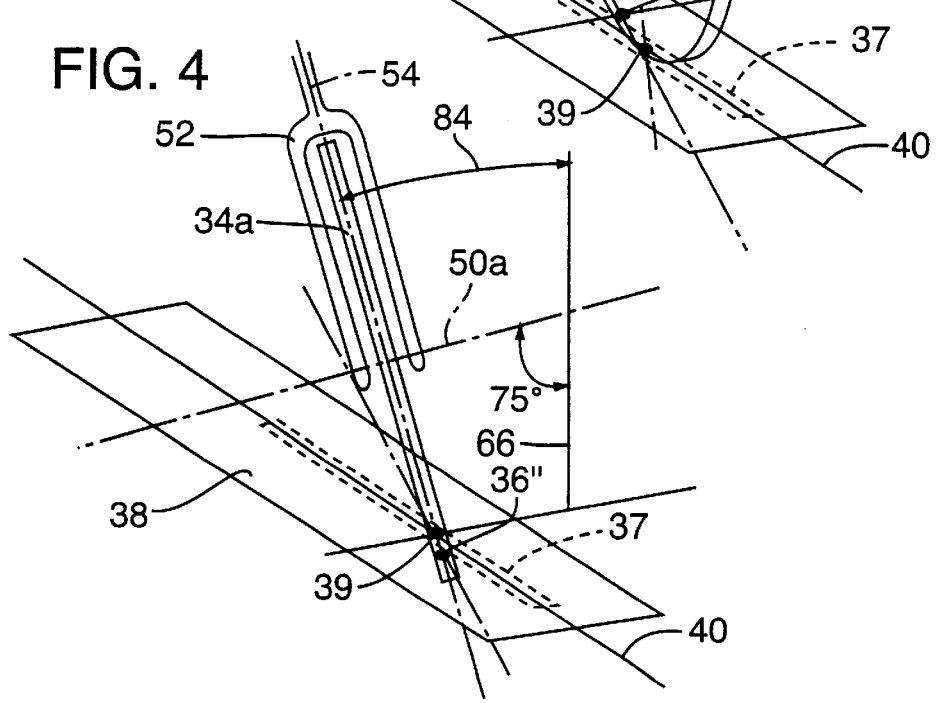

FIG. 5 Movement of Prior Art Device
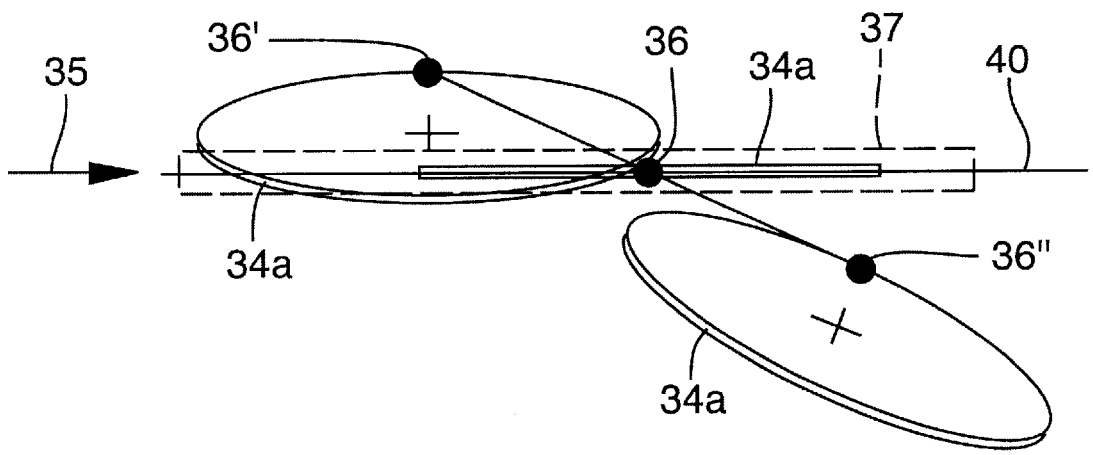
FIG. 6 (OUT OF PLANE)
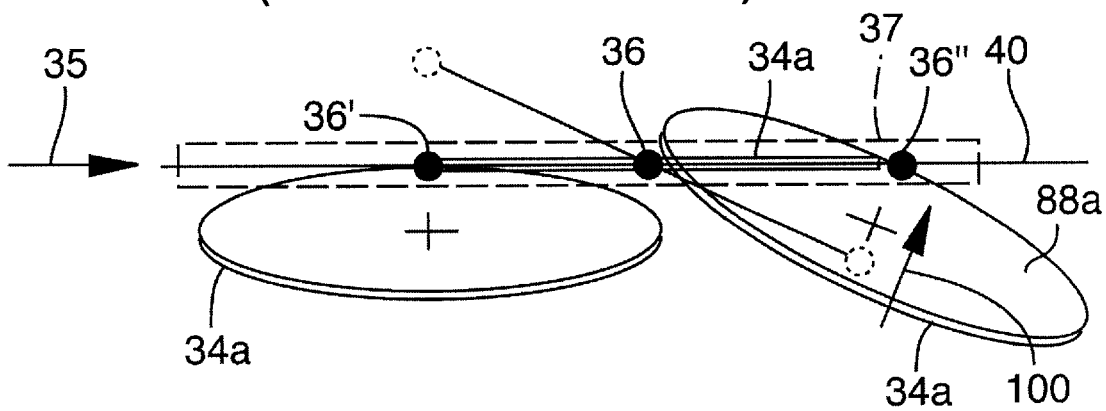
FIG. 7 (IN PLANE)
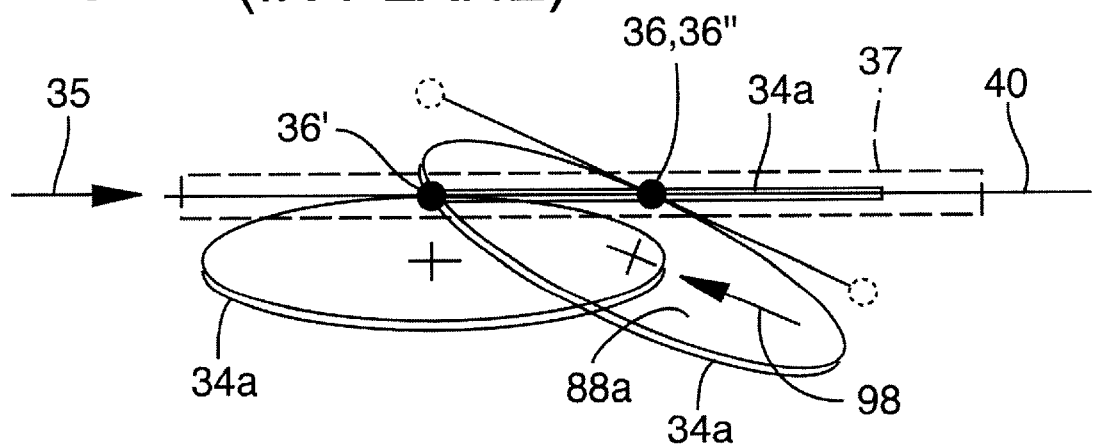

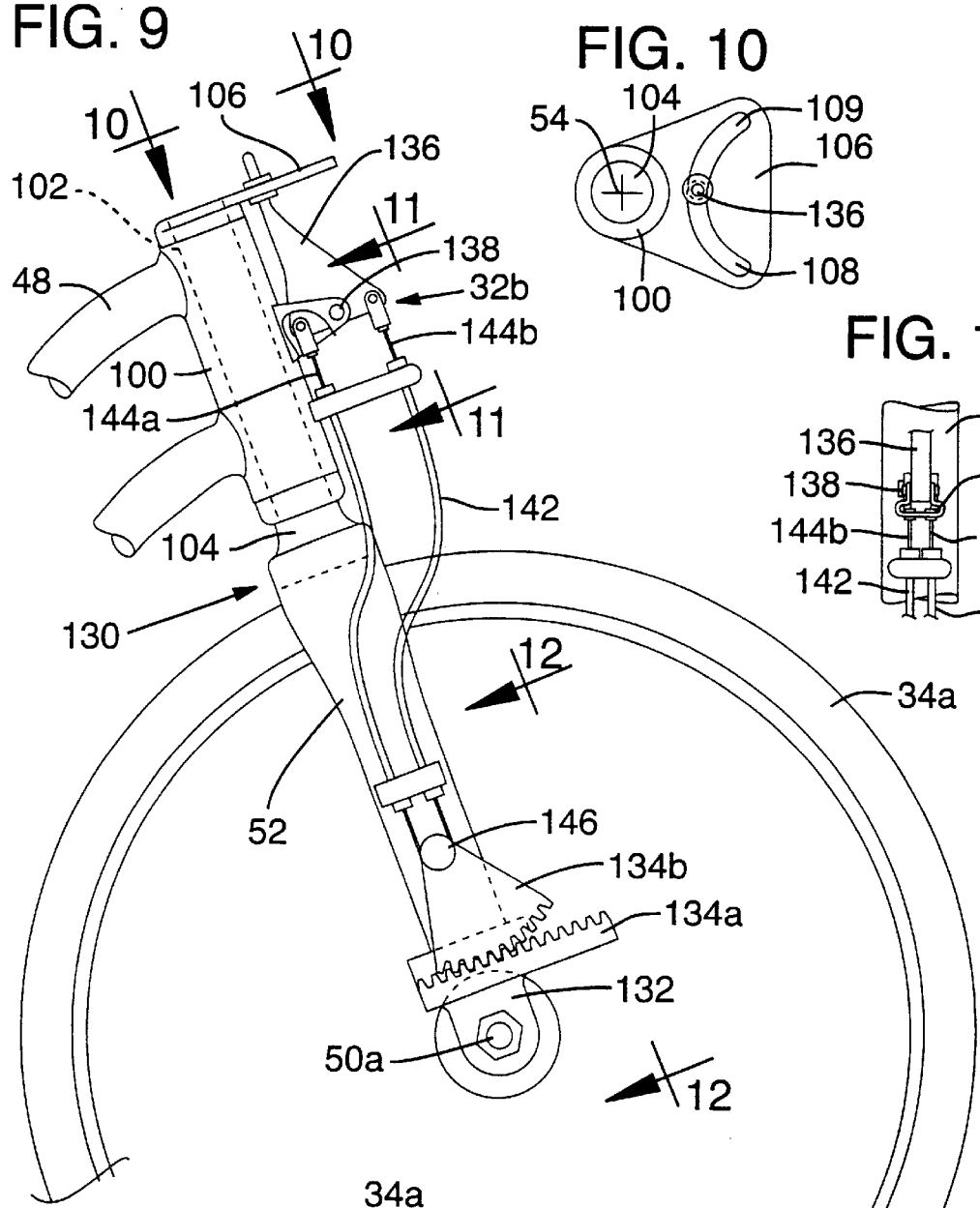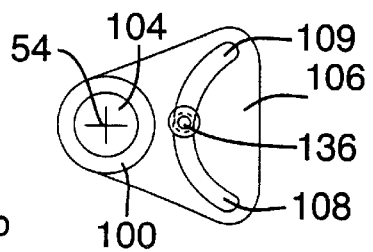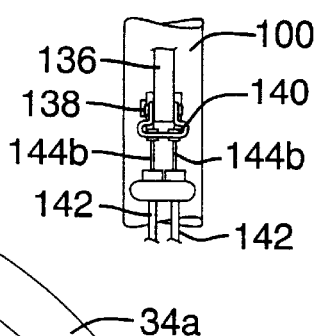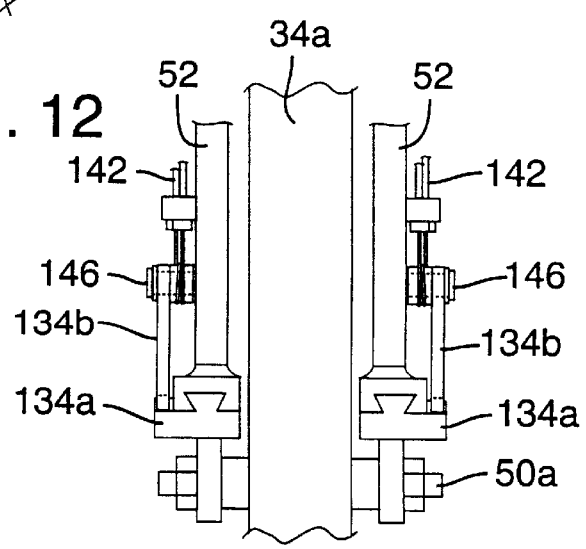

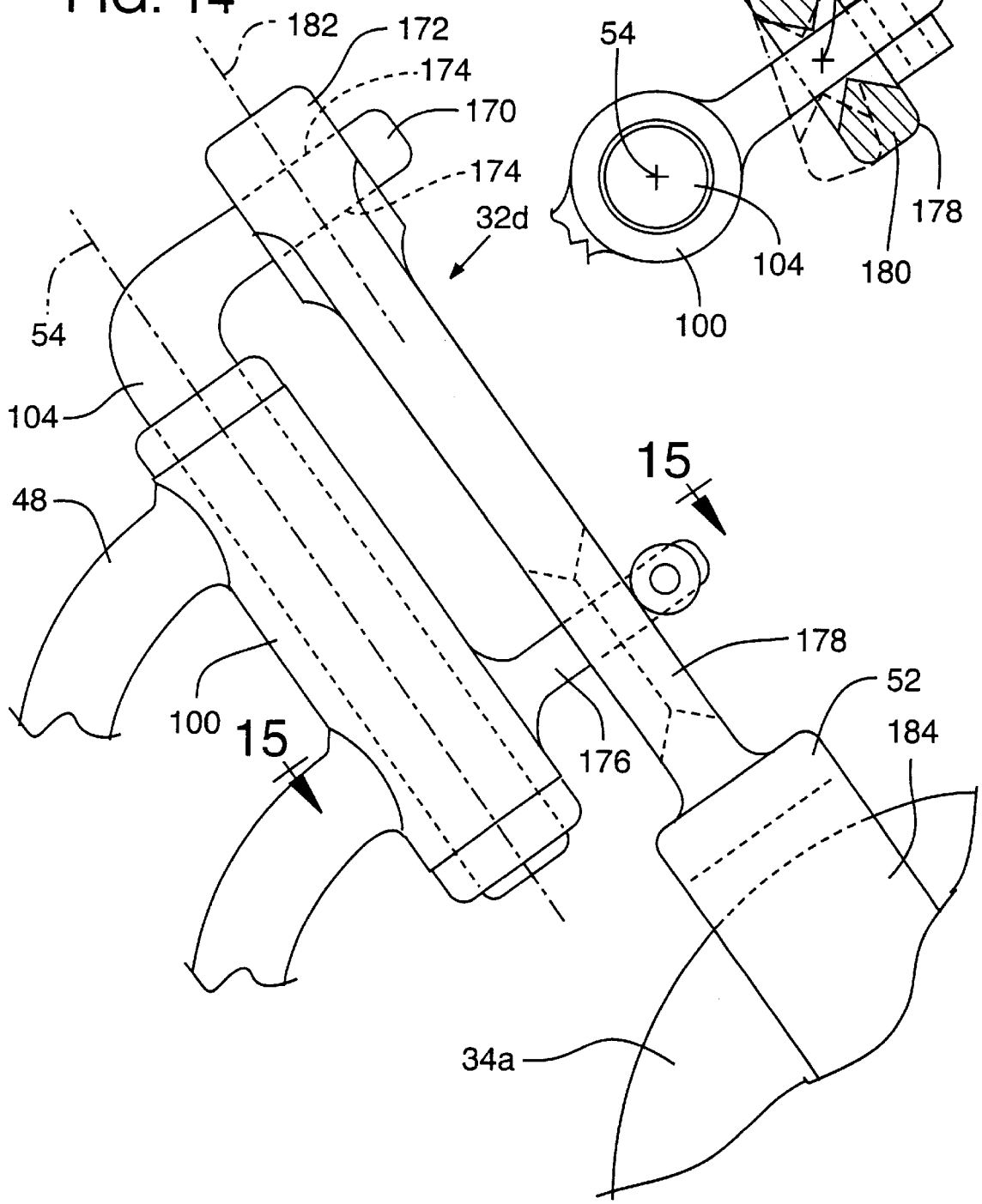

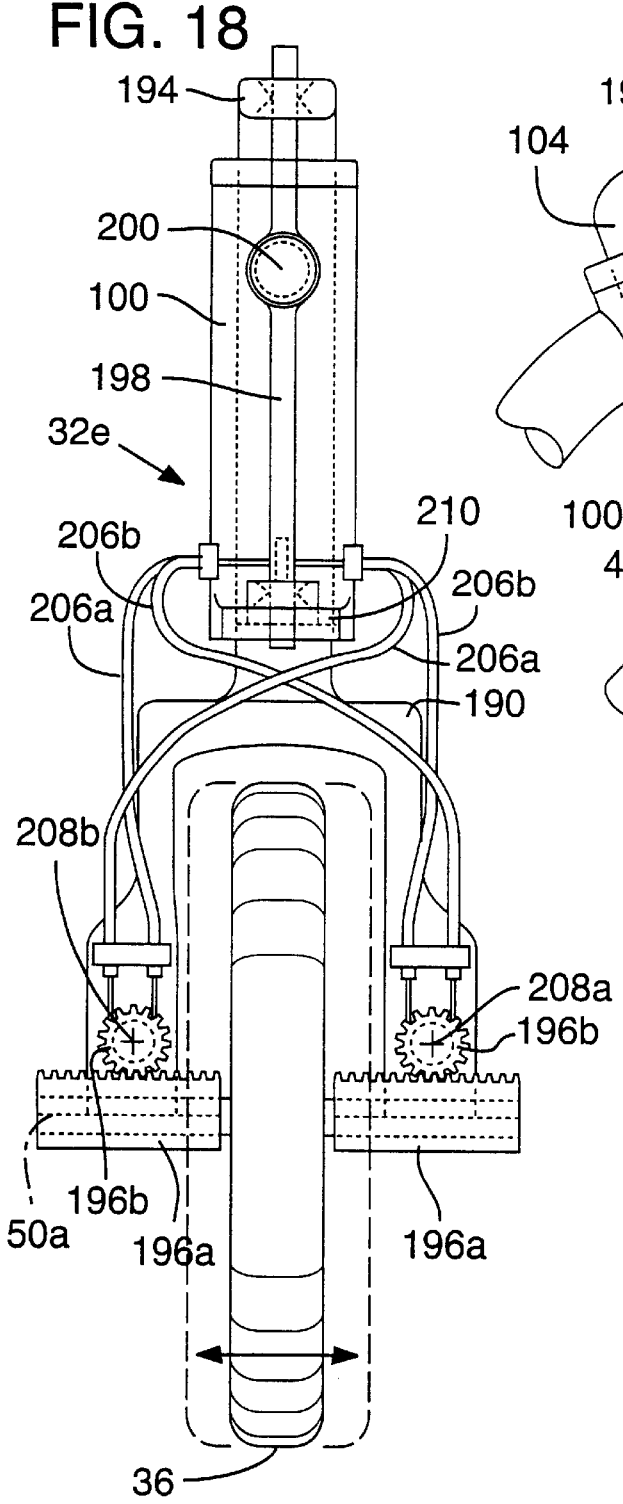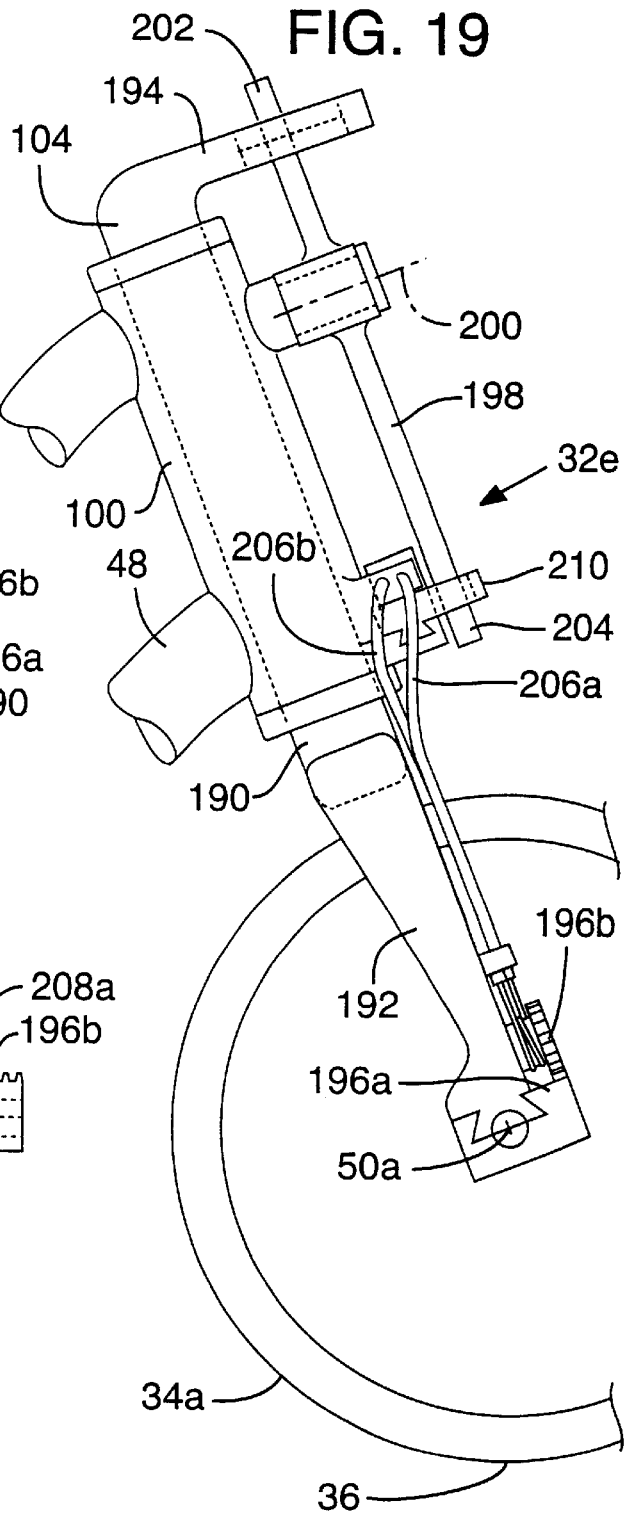

STABLE AND MANEUVERABLE TWO-WHEELED VEHICLE

TECHNICAL FIELD

The invention is an improved two-wheeled vehicle. In particular, the invention concerns a two-wheeled vehicle that maintains the area of contact of the steering wheel near an optimal plane during both straight and turning operations, thereby improving stability and maneuverability. Preferably, this is accomplished with a dynamically-variable linkage connecting one or more of the wheels to the chassis of the vehicle. Forces acting on the linkage during operation of the vehicle actuate the linkage to bias the wheels into the optimal plane.

BACKGROUND OF THE INVENTION

Historically, wheeled vehicles and especially in-line, two-wheeled vehicles such as bicycles, motorcycles, scooters, and the like, have been popular forms of transportation, exercise, and sport. More recently, such vehicles are being used in particularly rugged environments including unimproved roads and rough terrain. For example, similar to a conventional snowboard operating over a snow-covered hill, it is desirable to use an in-line wheeled vehicle to travel downhill over rough terrain.

In general, a rider balances on an elongated frame of the vehicle while it is either being propelled by gravity, the rider or self-propelled, and steers the vehicle either by tilting the vehicle, as with a skateboard, or rotating a steering mechanism, such as the handle bar of a conventional bicycle, to turn at least one of the wheels on a fixed axis of rotation. In virtually all uses of such vehicles, it is desirable for the vehicle to travel smoothly, steer easily and responsively, and remain stable during both steady-state and dynamic operation.

The rider on a two-wheeled vehicle is a critical element in the dynamic balancing of the system, which must be stable for successful operation of the vehicle. In particular, similar to a person balancing a stick on his finger, the rider of a two-wheeled vehicle is the active element maintaining stability of the system. The rider develops particular skill to use his or her senses (i.e., eyes, ears, sense of balance, etc.) to detect if there is a need for corrective balancing action, and the degree and type of corrective force needed.

Preferably, stable operation includes the steering wheel remaining in its commanded position (i.e., either aligned straight or at a commanded turn angle) when no dynamic input or other disturbances are acting on the steering mechanism. Such stable operation is particularly desirable, but especially difficult to maintain, when the vehicle is operated over rough terrain.

As children first attempting to ride a bicycle learn, maintaining dynamic balance on a two-wheeled bicycle requires experience and skill. Numerous forces act on a two-wheeled vehicle to keep it dynamically balanced during operation. These forces include gravity, inertia, friction, and gyroscopic forces generated by the spinning wheels. A rider typically manipulates the vehicle by leaning and turning the handlebar to maintain dynamic balance and thereby maneuver the vehicle.

Particularly skilled riders can maintain stable, dynamic balance of traditional bicycles traveling straight without holding the handlebars. In such case, they may even be able to turn their bicycles left or right simply by leaning their body and tilting the vehicle. However, minor transient disturbances, such as those associated with riding on an uneven or rough road surface, or the rider needing to change speed or steering directions, quickly destabilize the vehicle.

In more technical terms, for any given two-wheeled vehicle, there is an overall operating envelope of speeds and turn radii for a given terrain in which the vehicle is expected to operate effectively. Similarly, for any given two-wheeled vehicle there is a controllable operating envelope of speeds and turn radii for a given terrain in which the riders' ability to simply tilt the vehicle in one direction or the other is sufficient to correct dynamic instabilities arising during operation of the vehicle, while still maintaining controllability of the vehicle (e.g. also maintaining tilting commanding the vehicle to turn). Unfortunately, with conventional two-wheeled vehicles, the controllable operating envelope is much smaller than the desired operating envelope of the vehicle. Accordingly, traditional two-wheeled vehicles are hand-steered to maintain controllability and stability of the vehicle throughout the entire operating envelope of the vehicle.

Previously, the key elements leading to two-wheeled vehicle stability have not been fully understood. This has limited the size of the controllable operating envelope of traditional two-wheeled vehicles. A typical bicycle or scooter will have a pair of in-line wheels operably secured to a base. Both wheels are typically rotatably secured to the base, such that they rotate freely about their axles to carry the vehicle on a substantially planar running surface. In addition, the front wheel is usually pivotally secured to the base along an axis, commonly known as a steering axis, which is substantially orthogonal to the surface such that the front wheel turns from side-to-side with respect to the base along this axis.

In general, and as discussed more fully in U.S. Pat. No. 5,160,155 to Barachet, the front wheel's point of contact with the planar running surface of the conventional two-wheeled vehicle is behind the point at which a line extended from the steering axis contacts the same surface. The distance between these two points is commonly referred to as the vehicle's "trail." This orientation allows the front wheel to operate like a conventional caster. Namely, because of a moment arm defined by the trail, the front wheel will turn in the direction of the bases' tilt. Accordingly, to some extent, a rider can steer the vehicle simply by tilting the base to one side.

Conventional two-wheeled vehicle dynamic stability analyses focus on determining the optimal length of the trail for a given design. This process has typically been a trial-and-error approach for a given commercial product. For example, as documented in an article titled "A Fresh Look At Steering Geometry" of the February 1981 issue of Cycling USA, Mathematics professor John Corbet experimented with trail lengths ranging from $7/8$ of an inch to $4 5/16$ inches. He found that with the trail set at approximately $1 5/8$ inches the bicycle felt "nervous." With a trail of $1 3/16$ inches, it had "the sort of hands-off stability which seems desirable yet still turns easily," and with the trail of $2 15/16$ inches, "it was very heavy feeling."

These conventional stability studies of hand-steered two-wheeled vehicles focus on the dynamic stability of the vehicle during straight, steady-state operation. Accordingly, experimentation has found that the larger the trail, the greater the straight, steady-state stability of the vehicle. However, such stability usually comes at the expense of vehicle controllability and dynamic stability of the vehicle during a turn. These studies of hand-steered two-wheeled vehicles are characterized by their qualitative nature and subjective results. Moreover, the studies focus virtually exclusively on the vehicle's trail, and they do not explicitly define the qualities that determine the operational desirability of a vehicle. Instead, they concentrate on "hands-off stability" without defining or evaluating controllability.

Barachet shows two-wheeled vehicles having different caster angles (also referred to as the "rake angle" which is defined as the angle between the steering axis and vertical). Arguably, these figures could be interpreted to suggest that caster angle is another important factor in two-wheeled vehicle stability (i.e. the ability of the vehicle to remain in a state in the presence of disturbances and with no rider input) and control (i.e., the ability of the board to respond in a predictable and desirable manner to rider commanded inputs.) Barachet struggles with finding an optimal design that provides desirable performance over the envelope of operations while having a fixed trail and caster angle. He acknowledges the limitations with his designs by showing several approaches aimed at biasing the steering wheel to a neutral position, and by depending upon unusual athletic techniques of the rider to control and maintain stability of the vehicle.

Another example of the limitations found with conventional analysis of two-wheeled vehicle stability and control can be found in the book *Bicycling Science* (2nd edition 1995), written by Massachusetts Institute of Technology engineering instructor David Wilson and Frank Whitt. This book summarizes the state-of-the-art of bicycle engineering, and is grounded in solid mathematical-based technical discussions that reflect the support and involvement of a broad spectrum of experts in the field.

A chapter in this book, entitled "Balancing and Steering," discusses the current state of understanding of in-line, two-wheel vehicle dynamics and the handling qualities of bicycles, It ultimately concludes that "the balancing and steering of bicycles is an extremely complex subject on which there is a great deal of experience and rather little science." This situation exists despite the attention of several famous mathematicians and analytical engineers attempting to quantitatively understand these concepts. They conclude that caster angle and trail are important factors in the handling of a two-wheeled vehicle, but they acknowledge that there is no consensus or understanding as to why these elements are important, or if there are other elements that are equally important in understanding the concepts. Accordingly, as with professor John Corbet's work previously described, their work has focused on empirical efforts to quantify the ranges and combinations of these two dimensions as to their relation to "good" handling of a bicycle. This has led to a good understanding of which values and combinations of caster angle and trail produce acceptable handling performance, but not much insight as to why.

Some inventors have attempted to improve a wheeled-vehicles' ability to operate over rough terrain. However, such improvements have typically been in the form of introducing improved suspension systems between the wheels and the base of the vehicles. For example, U.S. Pat. No. 5,868,408 to Miller teaches mounting two pair of wheels to a board. One pair of wheels is mounted toward the front of the board and the other pair of wheels is mounted toward the rear of the board. Each pair of wheels is pivotally secured to the board, such that the wheels rotate about respective steering axes. Each wheel is linked to the steering axis through a dynamic linkage that is spring-biased to a neutral position. As one of the wheels hits an obstacle, the spring is compressed, and the wheel is deflected upward to allow the obstacle to pass.

The quality that determines a vehicle's desirability with regards to riding over irregular or rough surfaces is its ability to absorb the influence of the terrain or isolate the rider from the influence of the terrain without diminishing the rider's ability to control the vehicle. As described above, much effort has been expended designing and implementing suspensions that will absorb the dynamics of the terrain by putting springs and dampers between the wheels and the base of the vehicle. Although this approach offers some benefits, it does not change the inherent characteristics of the vehicle that determine the susceptibility to the roughness of the terrain.

There are two axes associated with a vehicle that are pertinent to the dynamics that are induced by the terrain. These are the vehicle's roll axis (which runs longitudinally through the vehicle and is nominally horizontal) and the pitch axis (which is perpendicular to the roll axis and is nominally horizontal). A four-wheeled vehicle is influenced by terrain roughness about both axes while an in-line two-wheeled vehicle is influenced only about the pitch axis. Therefore, the in-line two-wheeled vehicle is much more accommodating of irregular or rough riding surfaces by its inherent characteristics. This is evidenced by a motorcycle's ability to negotiate much rougher terrain than a four-wheeled vehicle such as a Sport Utility Vehicle.

While the suspension linkages in Miller offer a smoother ride, they do not teach or suggest a way for allowing a two-wheeled vehicle to remain dynamically stable, but still highly maneuverable, during both straight and turning operations.

Accordingly, despite the improvements of the conventional devices, there remains a need for an economical, two-wheeled vehicle that is highly stable, even over rough terrain, but still highly maneuverable simply by a user tilting the vehicle with their feet as is done with a snowboard, surfboard or skateboard. In addition to other benefits that will become apparent in the following disclosure, the present invention fulfills these needs.

SUMMARY OF THE INVENTION

This invention provides a two-wheeled vehicle, with the wheels mounted in an in-line fashion, that maintains the area of contact of the wheels in an optimal controllability area during both straight and turning operations, thereby expanding the controllable operating envelope of the vehicle to be substantially coincident with the overall operating envelope of the vehicle. Preferably, this is accomplished with a position regulator, such as a dynamically-variable linkage (DVL), connecting one or more of the wheels to the chassis of the vehicle. The position regulator permits a rider to reliably and easily control and maneuver throughout the operating envelope of the vehicle simply by tilting the vehicle.

A previously unrecognized, but major factor in two-wheeled vehicle stability is the un-stabilizing force associated with the point-of-contact of the steering wheel, which is pivotally secured to the vehicle along a steering axis, being spaced too far away from the vehicle plane, defined as the plane that includes the rear wheel's point-of-contact and the steering axis, when the steering wheel is turned. The optimal controllability area is defined as the maximum distance the point-of-contact of the steering wheel can be from the vehicle plane while still maintaining easy control and stability of the vehicle throughout a reasonable operating envelope of the vehicle, which is preferably the overall operating envelope of the vehicle. As a result, stable, hands-free maneuvering of the vehicle is possible simply by tilting the base in the direction of a desired turn, even over rough terrain, and without a user requiring excessive corrective force or unusually special balancing skills.

In a preferred embodiment, the rider of the invention stands on a substantially planar standing surface in the same manner as a rider of a surfboard, snowboard, or skateboard.

Once the steering wheel's point-of-contact is out of the vehicle plane, there are an infinite number of directions or paths the steering wheel's point-of-contact can take to return to the optimal controllability area. All of these can be characterized with respect to the plane of the steering wheel. If the return path of the steering wheel's point-of-contact is parallel to the wheel plane it is called "in-plane" movement. Where the return path of the steering wheel's point-of-contact is in a direction perpendicular to the front wheel plane, this is referred to as "out-of-plane" movement. Any path of the steering wheel's point-of-contact back to the neighborhood of the vehicle plane can be categorized as an "in-plane" or "out-of-plane" movement, or a combination of the two. Such movements can occur through axial, linear, or angular movement of the wheel with respect to its corresponding mounting frame.

The principles of this invention can be applied equally well to powered and de-powered vehicles, and with or without additional suspension systems aimed at smoothing the vehicle's ride. A plurality of such linkages can be installed on the vehicle to further enhance stability and performance of the vehicle.

BRIEF DESCRIPTION OF THE DRAWINGS

FIG. 2 is a fragmentary, isometric, schematic view of the steering wheel portion of a conventional two-wheeled vehicle traveling straight and showing orientation of various components related to the steering wheel with respect to a substantially horizontal ground plane and a vertical plane.

FIG. 3 is the conventional two-wheeled vehicle of FIG. 2 with the steering wheel in a turned position and showing orientation of various components related to the steering wheel with respect to the ground and vertical planes.

FIG. 4 is the conventional two-wheeled vehicle of FIG. 2 with the steering wheel in the turned position of FIG. 3 and the vehicle tilted to one side and showing orientation of various components related to the steering wheel with respect to the ground and vertical planes.

FIG. 5 is a top, schematic view of the conventional two-wheeled vehicle of FIG. 2A showing the points-of-contact of the steering wheel with respect to controllability area 37 on a substantially horizontal ground plane at three points 36, 36', 36" during a turn.

FIG. 6 is a top, schematic view the two-wheeled vehicle of FIG. 1 showing the points-of-contact of the steering wheel with respect to controllability area 37 on a substantially horizontal ground plane at the same three points 36, 36', 36" of a turn shown in FIG. 5. The point of contact of the steering wheel maintains alignment with the vehicle plane throughout the turn by moving the steering wheel out-of-plane from the steering wheel plane.

FIG. 7 is a top, schematic view of the two-wheeled vehicle of FIG. 1 showing the points-of-contact of the steering wheel on a substantially horizontal ground plan at the same three points 36, 36', 36" of a turn shown in FIG. 5. The points-of-contact of the steering wheel maintain alignment with the vehicle plane throughout the turn by moving the steering wheel in-plane with the steering wheel plane.

FIG. 9 is a fragmentary side view of the two-wheeled vehicle of FIG. 7 with the vehicle having an in-plane, axial fork movement, dynamically-variable linkage.

FIG. 10 is a top view of the variable geometry cam taken along line 10—10 off FIG. 9.

FIG. 11 is an exploded, fragmentary view of the cable linkage assembly taken along line 11—11 of FIG. 9.

FIG. 12 is an exploded., fragmentary view of a lower portion of the cable linkage assembly taken along ling 12—12 of FIG. 9.

FIG. 14 is a fragmentary, side view of the two-wheeled vehicle of FIG. 6 with the vehicle having an out-of-plane, angular fork movement, dynamically-variable linkage.

FIG. 15 is an exploded, fragmentary view taken along line 15—15 of FIG. 14.

FIG. 18 is a fragmentary, front view of the two-wheeled vehicle of FIG. 6 with the vehicle having an out-of-plane, linear fork movement, dynamically-variable linkage.

FIG. 19 is a fragmentary, side view of the linkage of FIG. 18.

DETAILED DESCRIPTION OF PREFERRED EMBODIMENTS

Figure 1A:
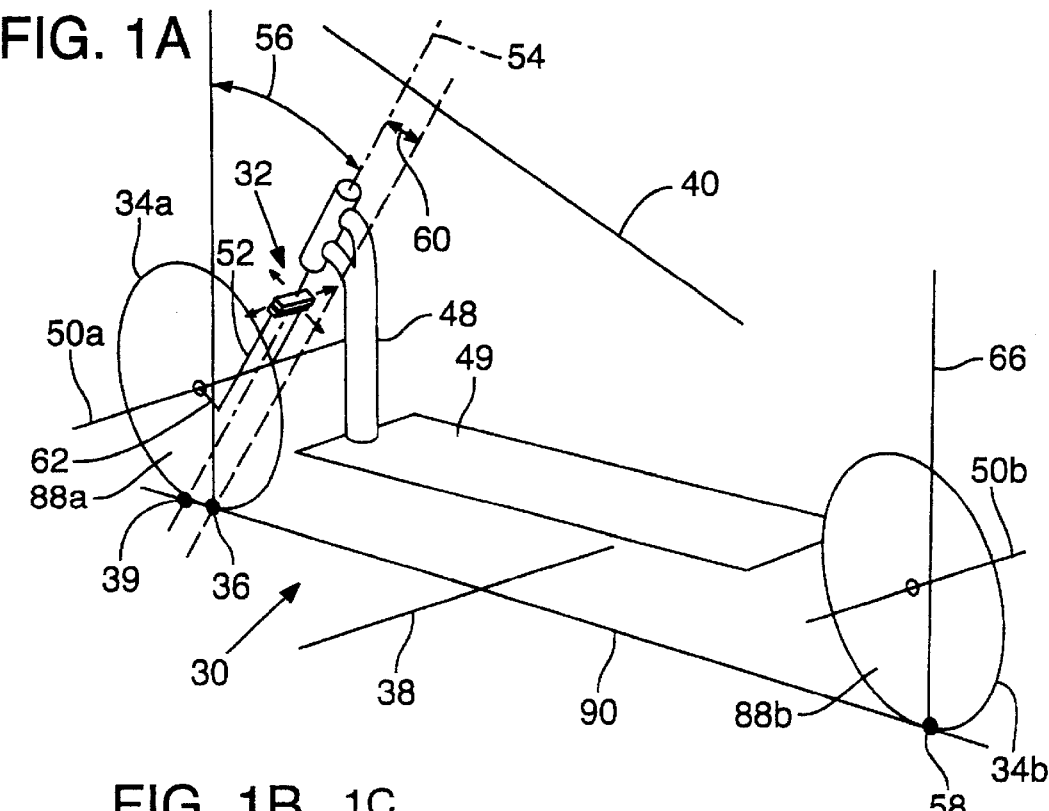
FIG. 1A is an isometric schematic view of a two-wheeled vehicle in accordance with a preferred embodiment of the present invention.
Figure 1B:
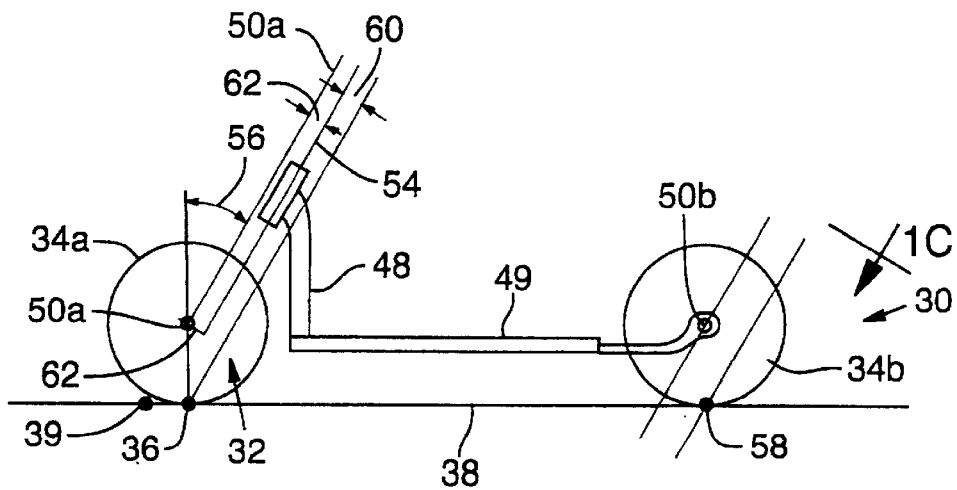
FIG. 1B is a side view of the two-wheeled vehicle of FIG. 1A.
Figure 1C:
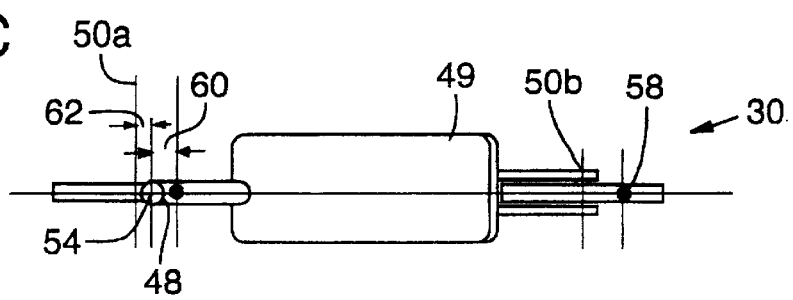
FIG. 1C is a top view of the two-wheeled vehicle of FIG. 1A.

Several preferred embodiments of a two-wheeled vehicle 30 that maintain the point-of-contact of the steering wheel 34a in an optimal controllability area 37 (FIGS. 6–7) during both straight and turning operations, thereby expanding the controllable operating envelope of the vehicle to be substantially coincident with the overall operating envelope of the vehicle are disclosed in FIGS. 1–20. This is preferably accomplished with at least one dynamically-variable linkage 32 (FIGS. 1 and 8–22) regulating the position of at least one steering wheel 34a. The general concept of the invention is shown in schematic diagrams in FIGS. 1–7, with the physical characteristics leading to the instability of conventional two-wheeled vehicles shown in FIGS. 2–5. The solution provided by dynamically-variable linkages is shown schematically in FIGS. 6 and 7. Exemplar dynamically-variable linkages that follow the basic concept of the invention are disclosed in FIGS. 8–22.

A. Force Alignment Stabilization

One of the primary factors leading to two-wheeled vehicle instability is the fact that the forces leading to this instability and a rider's ability to detect and correct for those instabilities have been misunderstood.

In particular, and referring specifically to FIGS. 1A–D, which include many aspects of a conventional two-wheeled vehicle, a conventional two-wheeled vehicle includes the front steering wheel 34a and an in-line rear wheel 34b operably secured to a base. Both wheels 34a, 34b are typically rotatably secured to the base 48, which preferably has a planar surface 49, such that they rotate freely about their axles 50a, 50b to carry the vehicle 30 on the ground plane 38. In addition, the steering wheel 34a is usually pivotally secured to the base 48, preferably with a fork 52, and aligned along an axis, commonly known as a steering axis 54, which is substantially orthogonal to the surface (i.e., to within the caster angle 58) such that the front wheel 34a turns from side-to-side with respect to the base 48 along this axis 54. The orientation of the steering wheel with respect to the steering axis is fixed in a conventional two-wheeled vehicle.

The geometry of these components define several relationships that are important to understanding the stability problems associated with the designs of conventional two-wheeled vehicles, and the solution offered by the force alignment stabilization of the present invention. These relationships include the ground plane 38 and the vehicle plane 40, defined as the plane including the rear wheel's area of contact, which is preferably a point of contact 58, and the steering axis 54. The trail 60 is the distance between the steering wheel's point of contact 36 with the ground plane 38 and the point 39 at which a line extended from the steering axis contacts the ground plane 40. The steering wheel offset 62 is the closest distance between the steering wheel's axis of rotation, or axle 50a and the steering axis 54.

During operation of the vehicle 30, the base 48 tilts side-to-side with respect to the ground plane 38 defining a roll angle 84 as the angle between the vehicle plane 40 and a vertical plane 66 perpendicular to the ground plane.

Unlike a car but like a bicycle or surfboard, the rider 70 (FIG. 1D) is a critical element in a dynamic system that must be stable for successful operation: The rider 70 of the invention is the active element maintaining stability. The rider himself has all the motion sensors (i.e., eyes, ears, sense of balance, etc . . . ) to tell him if there is a need for action and the degree of the need. Once the rider determines a correction is necessary, he must put a control input to the rest of the system by moving his feet in a tilting manner. For the overall vehicle system to operate successfully, the vehicle 30 must respond in a predictable and consistent manner for the rider 70 to realize the intended and expected results. The present invention provides a vehicle response to the rider's inputs that is desirable and amenable to stabilizing the vehicle system in a predictable and consistent fashion.

It is necessary that the design of this invention attain a level of robustness such that disturbances over Which the vehicle is moving do not impede the operation of the vehicle. These disturbances can be characterized as irregularities in the riding surface (i.e., bumps, depressions, or debris in the road). The present design provides a stabilized and controlled response through a reasonable envelope of operation, commonly referred to as an overall operating envelope herein. This overall operating envelope is defined by speed, maneuverability (i.e., radius of a turn), and riding surface irregularity.

Figure 1D:
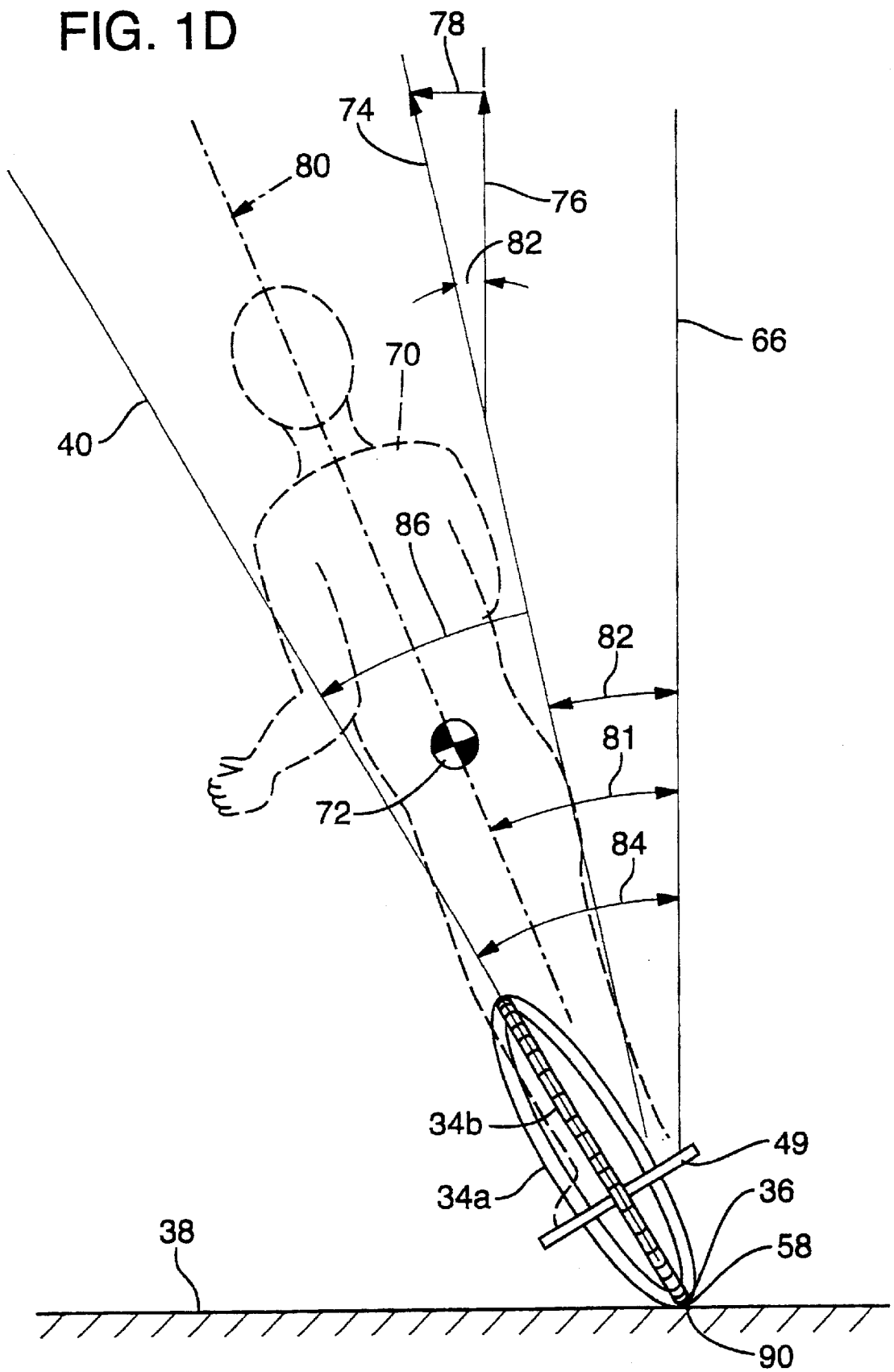
FIG. 1D is a rear view of the two-wheeled vehicle of FIG. 1A showing a possible side-ways' tilting of the vehicle and its related orientation geometry.

As best shown in FIG. 1D, the rider 70 preferably commands the vehicle by manipulating the base 48, which preferably has a planar surface 49 as shown. In particular, the rider 70 controls the orientation of the base 48 with respect to the ground plane 38 (i.e., tilt). During straight and upright operation of the vehicle 30, the dynamic system consisting of the vehicle and rider (collectively referred to as the rider-vehicle system herein) is said to be at a point of unstable equilibrium. This means that if there are no control inputs (i.e., the rider 70 is not moving the board) or disturbances (i.e., irregularity in riding surface) the system will continue in this state. This situation is directly equivalent to the act of balancing.

The rider 70 on this vehicle, as on a bicycle or snowboard, is dynamically similar to the previously discussed balancing of a stick on a finger. Namely, the weight of the stick (i.e., gravity acting through the center-of-gravity of the stick), which is above the supporting force provided by the finger, is an inherently unstable system that must be stabilized by an active control element, such as the human. In balancing the stick, the finger is moved back and forth to continually align the supporting force with the weight force so that any destabilizing torque due to the misaligned forces will be maintained at zero: the stick will balance straight on the finger without moving. Likewise, in the present invention, as long as the force due to gravity 76 (FIG. 1D), the dynamic forces associated with centripetal acceleration 78 (FIG. 1D) and the like, and the combined mass of the vehicle and rider Center-of-Gravity 72 (FIG. 1D) are perfectly aligned with the force exerted on the wheels 34a, 34b through their respective points-of-contact 36, 58, the vehicle 30 and rider 70 will stay upright.

In particular and referring to FIG. 1D, the term specific force 74 refers to the resulting force which is the summation of the gravity force 76 and the force due to centripetal acceleration 78. If support of the stick on a finger was in a state of acceleration, then the point of unstable equilibrium would move such that the specific force acting through the center-of-gravity of the stick would be aligned with the line that is between the center-of-gravity of the stick and the support point of the stick in the same fashion it was aligned in the stationary situation. Likewise, the rider-vehicle system will adjust its point of unstable equilibrium in the presence of acceleration such as in a constant radius turn. In a balanced system, the rider-vehicle system will lean into the turn such that the system plane 80, which is defined as a plane that includes the points-of-contact 36, 58 of wheels 34a, 34b, respectively, and the rider vehicle system's center-of-gravity 72, contains the specific force 74.

The degree of alignment of the specific force 74 with the system plane 80 determines the dynamic state of the system. If the specific force 74 is not in the system plane 80, then the rider-vehicle system is either moving out of a turn or into a turn. The angle that the specific force makes with vertical, (as defined by gravity) is referred herein as the "bank angle" 82. In a similar sense, the "system angle" 81 is the angle the system plane 80 makes with respect to the vertical plane 66 as defined by gravity. So the rider-vehicle system is in unstable equilibrium when the system angle 81 and the bank angle 82 are equal.

From the above discussion, it is now clear that for the rider-vehicle system to be stable or controllable, the system angle 81 and the bank angle 82 must be equal or close to equal. At times these two angles 81, 82 cannot be equal, for example, when a rider starts or ends a turn. Accordingly, the rider 70 will manage this angular difference by modulating centripetal acceleration, which occurs by controlling the orientation of the steerable wheel. If the wheel planes 88a, 88b (FIG. 1A) of the two wheels 34a, 34b are not coincident then the vehicle 30 is turning. When the vehicle 30 turns, centripetal acceleration 78 (FIG. 1D) is developed and the specific force 74 (FIG. 1D) is affected.

To stabilize the combined rider-vehicle system, the rider 70 must be able to steer at least the front wheel 34a (note: both wheels may turn but for clarity of this discussion it is assumed only the front wheel can turn). The only input to the vehicle 30 the rider 70 has is the position of the base, which is preferably a board having a substantially planar surface 49, about the roll axis 90 (FIG. 1). The roll axis 90 is a line running through the points-of-contact 36, 58 of the two wheels 34a, 34b.

As the rider 70 changes the orientation of the base 48 about the roll axis 90, the front wheel 34a turns because of torque generated about the steering axis 54. The steering axis 54, which is not to be confused with the axle 50a, is an axis about which the front wheel 34a turns and is fixed with respect to the base 48. The wheel 34a is free to rotate about the steering axis 54 in response to torque generated about the steering axis 54. This torque is generated by the force associated with steering wheel's 34a point-of-contact 36 being aligned with the specific force 74. This force 74 will generate a torque about the steering axis 54 when it is not in a plane that contains the steering axis 54, or in other words, is not pointing at the steering axis 54. The vehicle plane 40 always contains the steering axis 54 and is defined by the plane containing the steering axis 54, and the point-of-contact 58 of the rear wheel 34b.

If the specific force 74:associated with the steering wheel's 34a point-of-contact 36 is in the vehicle plane 40, then no torque is generated about steering axis 54. If the specific force 74 is not aligned with the vehicle plane 40, then there may or may not be.torque about the steering axis 54 depending upon the particular geometry of the vehicle (i.e., the specific force 78 can still point at the steering axis 54 even if it is not in the vehicle plane 40).

As best shown in FIG. 1D, as the rider reorients the base 48 about the roll axis 90 the vehicle plane 40 angular displacement from the vertical plane 66 is changed (this angular distance is called the roll angle 84). This takes the vehicle plane 40 away from the specific force 74 and thereby causes a torque that results in the steering wheel 34a turning. As the wheel 34a is reoriented, the radius of the turn is changed which means that the centripetal acceleration 78 changes and the specific force 74 is reoriented. The specific force 74 is reoriented such that the roll angle 84 and the bank angle 82 are equal. The difference between the roll angle 84 and the bank angle 82 is called the control angle 86. When the total rider-vehicle system is operating correctly, the rider 70 causes a control angle 86 by tilting the base 48 and the system will then nullify it. The control angle 86 induces torque. The torque turns the front wheel 34a about steering axis 54. Turning the front wheel 34a changes the centripetal acceleration 78. This reorients the specific force 74 which returns the rider-vehicle system to the point of unstable equilibrium and zeroes the control angle 86.

Accordingly, the physical geometry of the steering wheel's 34a point-of-contact 36 with the ground plane 38 relative to the vehicle plane 40 is a significant factor in maintaining unstable equilibrium of a two-wheeled vehicle. If the point-of-contact 36 of the steering wheel 34a is positioned too far away from the vehicle plane 40, the resulting torque is too great to be corrected or controlled by a rider 70 simply by tilting the base. Accordingly, the present inventor has determined that all two-wheeled vehicles have an optimal controllability area 37, defined as the maximum distance from the vehicle plane 40 the point-of-contact 36 of the steering wheel 34a can be while still allowing a rider 70 to maintain easy control and stability of the vehicle 30 throughout a reasonable operating envelope of the vehicle, which is preferably the overall operating envelope of the vehicle 30.

Optimally, the point-of-contact 36 of the steering wheel 34a is in the vehicle plane 40. However, stability and controllable benefits may be obtained by maintaining the steering wheel's 34a point-of-contact 36 close enough to the vehicle plane 40 during turning operations such that the sum of the torque about the steering axis generate by friction of all the mechanical components that move with respect to one another, when forces on the wheel 34a, forces due to irregularities of the riding surface, and gyroscopic effects, sum to a low enough value that the rider can quickly and easily maintain dynamic balance of the system simply by tilting the base 48. Preferably this sum total of the torque about the steering axis is zero at point of unstable equilibrium.

B. Analysis of Conventional Two-Wheeled Vehicles

In light of the foregoing discussion, the reason conventional two-wheeled vehicles remain hands-free controllable only within a very limited controllable operating envelope can now be better understood. In particular, the front end of a conventional two-wheeled vehicle showing the relative geometry between the steering wheel's 34a point-of-contact 36 with the ground plane 38, the steering axis 54, the vehicle plane 40, and an optimal controllability area 37 during various phases of operation is shown schematically and highly exaggerated for clarity in FIGS. 2–4. While the steering wheel of this conventional two-wheeled vehicle may turn about its steering axis, the relative position of the wheel axle 50a relative to the steering axis 54 remains fixed throughout the entire range of motion of the steering wheel 34a.

When the conventional two-wheeled vehicle 30 is traveling straight along the ground plane 38 as shown in FIG. 2, the steering wheel 34a is aligned with the vehicle plane 40, and the point-of-contact 36 of the steering wheel 34a is substantially on the vehicle plane 40. Accordingly, since the point-of-contact 36 of the steering wheel 34a is within the optimal controllability area 37, it is possible for a rider 70 to maintain dynamic balance of the vehicle 30 simply by tilting the base 48.

However, when a turn is initiated as shown in FIG. 3, the point-of-contact 36' of the steering wheel 34a moves out of the vehicle plane 40 in a first direction away from the vehicle plane 40. If the commanded turn is sharp enough, the point-of-contact 36' will move outside of the optimal controllability area 37, thereby generating torque about the steering axis 54 that is too large to allow the rider 70 to maintain dynamic balance of the vehicle 30 and execute the turn at the same time simply by tilting the base.

Moreover, in addition to turning the steering wheel 34a, the typical turn usually includes tilting the vehicle 30 to produce a roll angle 84 as shown in FIG. 4. The simultaneous rolling of the vehicle 30 and turning of the steering wheel 34a about its steering axis 54 urges the steering wheel's 34a point-of-contact 36" to initially move back toward the vehicle plane 40 (from its position in FIG. 3) and then in a second direction away from the vehicle plane 40 as shown in FIG. 4. Again, this position of the point-of-contact 36" outside of the optimal controllability area 37 generates a torque about the steering axis 54 that is too large to allow the rider 70 to maintain dynamic balance of the vehicle and execute the turn at the same time simply by tilting the base 48.

FIG. 5 shows these relative points-of-contact 36, 36', 36" of the steering wheel 34a during a typical turn relative to the optimal controllability area 37 for a vehicle initially traveling in the direction of arrow 35. For a typical turn, the fixed geometry of conventional two-wheeled vehicles make this point-of-contact move in and out of the optimal controllability area, thereby making the vehicle inherently unstable during turning operations. Accordingly, most two-wheeled vehicles require additional control features, such as handlebars and the like, to allow a rider to maintain control of the vehicle throughout its entire operating envelope.

C. Steering Wheel Position Regulator

To expand the operational envelope and to make the vehicle 30 inherently stable and controllable within this envelope, it is necessary to maintain the steering wheel's 34a point-of-contact 36 within the optimal controllability area 37 of the vehicle, and preferably in the vehicle plane 40 during both straight and turning operations. Referring to FIGS. 6–22, one known way to accomplish this is to include position regulator, which is preferably a dynamically-variable linkage 32 between the base 48 and the steering wheel 34a. The dynamically-variable linkage 32 maintains the steering wheel's 34a point-of-contact 36 in or near the vehicle plane 40 so that the rider 70 can command a desired turn angle 92 on the steering wheel 34a, and maintain control and stability of the vehicle 30 as previously described simply by tilting the base 48.

In essence, the dynamically-variable linkage 32 moves the steering wheel 34a with respect to the base 48, as a function of the turn angle 92, so as to maintain the steering wheel's 34a point-of-contact 36 within the optimal controllability area 37, and preferably within the vehicle plane 40. The torque generated about the steering axis 54, as described above, operates the dynamically-variable linkage 32 so that the steering wheel 34a turns in response to the rider's 70 inputs, and the point-of-contact 36 stays in, or close to, the vehicle plane 40. The result is an in-line two-wheeled vehicle that a rider 70 may maneuver throughout its entire operating envelope in a fashion similar to a surfboard, snowboard, or skateboard.

Because no torque is generated about the steering axis 54 when the point-of-contact 36 of the steering wheel 34a is coincident with the steering axis 54, the vehicle 30 becomes unstable and uncontrollable at this point. Accordingly, care must be taken in sizing the relative components of the dynamically-variable linkages to prevent this characteristic from arising throughout the entire range of motion of the linkages. However, by optimizing the lengths of the vehicle's trail 60 and offset 62, this characteristic can be easily avoided.

The dynamically-variable linkage 32 can manipulate the steering wheel 34a in the manner described in several ways. One way includes moving the steering wheel 34a toward and away from the vehicle base 48, generally in-plane with the steering wheel plane 88a when the vehicle 30 is traveling 110 straight in the direction of arrow 35. This type of dynamic linkage is called "in-plane movement" herein and is shown schematically in FIG. 7. Another way to move the linkage 32 to accomplish force alignment stabilization is to move the steering wheel 34a generally side-to-side with respect to the steering wheel plane 88a. This type of dynamic linkage is called "out-of-plane movement" herein and shown schematically in FIG. 6. Any path the steering wheel's 34a point-of-contact 36 takes to maintain itself within the optimal controllability area 37 of the vehicle 30 can be categorized as in-plane movement, out-of-plane movement, or a combination of the two. Accordingly, these two-types of movement and exemplar linkages of them are discussed in greater detail below:

1. In-Plane Movement

In-plane movement includes a dynamically-variable linkage 32 that moves the steering wheel 34a toward and away from the base 34a generally along the steering wheel's plane 88a, such that it maintains the steering wheel's point-of-contact 36 within the optimal controllability area 37 throughout the entire range of motion of the steering wheel 34a. FIG. 7 shows the same three points-of-contact 36, 36', 36" shown in FIG. 5, but with a dynamically-variable linkage that provides in-plane movement throughout the previously described turn.

In particular, when the steering wheel 34a is only turned (as in FIG. 3), the in-plane, dynamically-variable linkage 32 urges the steering wheel 34a forward in the direction of arrow 96 along the steering wheel plane 88a such that the point-of-contact 36' is maintained in the controllability area 37. Similarly, when the vehicle 30 is simultaneously tilted and the steering wheel 34a is turned (as in FIG. 4), the in-plane, dynamically-variable linkage 32 urges the steering wheel 34a backward in the direction of arrow 98 along the steering wheel plane 88a to maintain the point of contact 36" within the controllability area 37.

Exemplar structures for providing this type of movement are discussed in greater detail below.

a. In-Plane Angular Fork Movement

Figure 8:
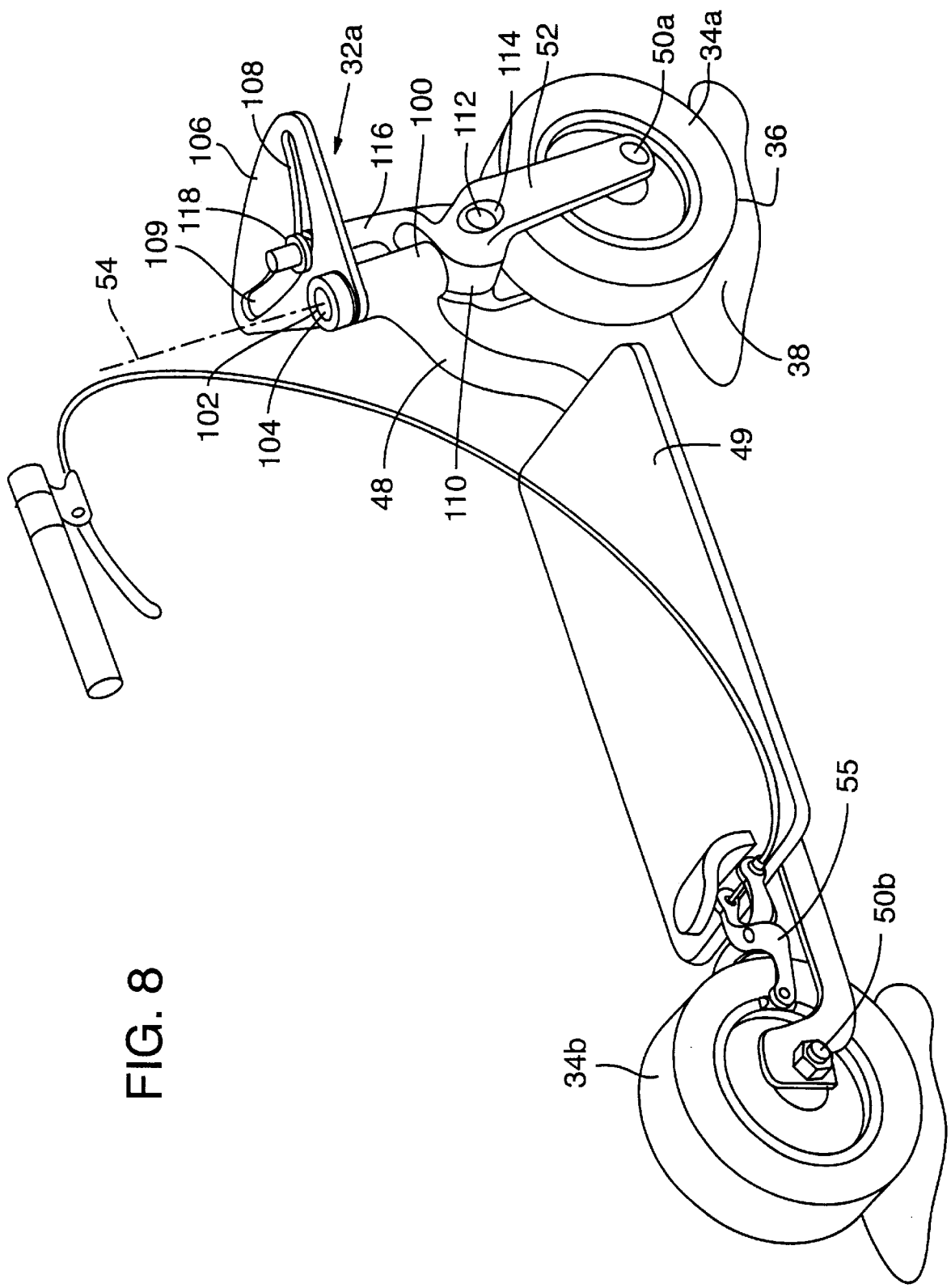
FIG. 8 is an isometric view of the two-wheeled vehicle of FIG. 7 with the vehicle having an in-plane angular fork movement, dynamically-variable linkage.

Referring specifically to FIG. 8, a two-wheeled vehicle 30 having a front steering wheel 34a that is operably secured to the base 48 with an in-plane, angular fork movement linkage 32a there between is disclosed. In particular, the vehicle 30 includes the front steering wheel 34a and an in-line rear wheel 34b operably secured to a base 48. Both wheels 34a, 34b are typically rotatably secured to the base 48, which preferably includes a substantially planar surface 49, such that they rotate freely about their axles 50a, 50b to carry the vehicle 30 on the ground plane 38. In addition, the steering wheel 34a is pivotally secured to the base 48, preferably with a wheel mounting portion such as a fork 52. The fork is preferably aligned substantially along an axis, commonly known as a steering axis 54, which is substantially orthogonal but slightly tilted with respect to the surface such that the front wheel 34a turns from side-to-side with respect to the base 48 along this axis 54. Preferably, a hand or foot brake 55 is operably secured to the rear wheel 34b.

In particular, the in-plane, angular fork movement linkage 32a includes a base mounting portion, which is preferably a fork mounting portion 100 extending from the base 48 and defining an elongate channel 102 for pivotally receiving a steering shaft therein. A steering head 106 is rigidly secured to the fork mounting portion 100:and preferably extends forward from the fork mounting portion 100, is substantially planar, is aligned substantially parallel with the planar surface 49, and includes a guide cam engaging portion 108 as shown.

The steering shaft 104 is operably secured within the channel 102 such that it pivots freely about the steering axis 54. The steering shaft 104 includes a fork engaging portion 110 for pivotally securing the fork 52. Preferably, this fork engaging portion 110 includes at least one shaft 112 extending from the fork engaging portion 110 and aligned generally parallel with the planar surface 49.

The fork 52 is operably secured to the fork engaging portion 110 of the sheering shaft 104, preferably through openings 114 for receiving the shaft 112 as shown, such that the steering wheel 34a moves angularly about the shaft 112, forward and backwards with respect to the base 48 along the steering wheel's plane 88a. Preferably, the openings 114 in the fork 52 for receiving the shaft 112 are tapered as shown to permit the base 48 to tilt side-to-side while maintaining the front and rear wheel's 34a, 34b contact with the ground plane 38.

The fork includes a guide cam portion 116 extending therefrom for operably engaging the guide cam engaging portion 108 of the steering head 106. Preferably, the guide cam engaging portion 108 is an elongate curved opening 109 in the steering head 106, and the guide cam portion 116 is elongate and slidably received within the curved opening 109.

The guide cam engaging portion 108, the guide cam portion 116, the fork 52, and other components are all sized and shaped such that the point of contact 36 of the steering wheel 34a is maintained within the controllability area 37 of the vehicle 30 through the entire range of motion of the steering shaft 104. Preferably, the center 118 of the cam engaging portion 108 is the closest to the fork mounting portion 100 with the ends of the cam-engaging portion 108 extending away from the fork mounting portion 100. More preferably, the guide cam portion 116 is aligned at the center of the cam-engaging portion 108 when the vehicle base 48 is substantially parallel to the ground plane 38 and the steering wheel 34a is aligned with the rear wheel 34b as shown in FIG. 8.

b. In-Plane Axial Fork Movement

Referring specifically to FIGS. 9–12, a front steering wheel 34a that is operably secured to the vehicle base 48 with an in-plane axial fork movement linkage 32b is disclosed. This embodiment has substantially the same basic elements and construction of the previously described embodiment. Accordingly, in order to avoid undue repetition, unless specifically identified otherwise below, reference numerals refer to like numbered elements having a like orientation and configuration as those elements identified in the discussion of the first preferred embodiment.

In this embodiment the steering shaft 104 and fork 52 are a single monolithic structure 130, and a wheel mounting portion 132 supporting the front wheel's axle 50a is slidably secured to the end of the fork 52 as shown to permit the steering wheel 34a to move forward and backward along the steering wheel's plane 88a relative to the base 48. This movement is preferably regulated by mating sprockets 134a, 134b. More preferably, an elongated substantially linear, or "rack," sprocket 134a is secured to the wheel mounting portion 132, and an axial, or "pinion," sprocket 134b is secured to the fork 52 for operably engaging the linear sprocket 134a as shown.

A guide cam 136 is pivotally secured to the fork mounting portion 100 at pivot point 138 such that it pivots about pivot point 138 as the guide cam 136 moves along the cam-engaging portion 108 of the steering head 106. Preferably, the steering head 106 is rigidly secured to the steering shaft 104 as shown, and the guide cam. 136 is pivotally secured to a mounting bracket 140 rigidly secured to the fork mounting portion 100.

A control cable 142 having two ends 144a, 144b is secured to the guide cam 136 on opposite sides of the pivot point 138 such that movement of the guide cam 136 about its pivot point 138 pulls one end (For example 144a) of the cable 142 and loosens the other end (For example 144b). The cable 142 is operably secured to the axial sprocket 134b such that this movement causes the sprocket 134b to rotate about its pivot axis 146 in one direction or the other, thereby engaging the linear sprocket 134a forward or backward, and moving the point of contact 36 of the steering wheel 34a forward-or-backward as described. More preferably, a pair of mating sprockets 134a, 134b and related control cables 142, one set on each side of the steering wheel 34a, are used.

The guide cam 136, the guide cam engaging portion 108, fork 52, mating sprockets 134a, 134b, and cables 142 are all sized and shaped such that the point of contact 36 of the steering wheel 34a is maintained within the controllability area 37 of the vehicle 30 throughout the entire range of motion of the steering shaft 104.

c. In-Plane Linear Fork Movement

Figure 13:
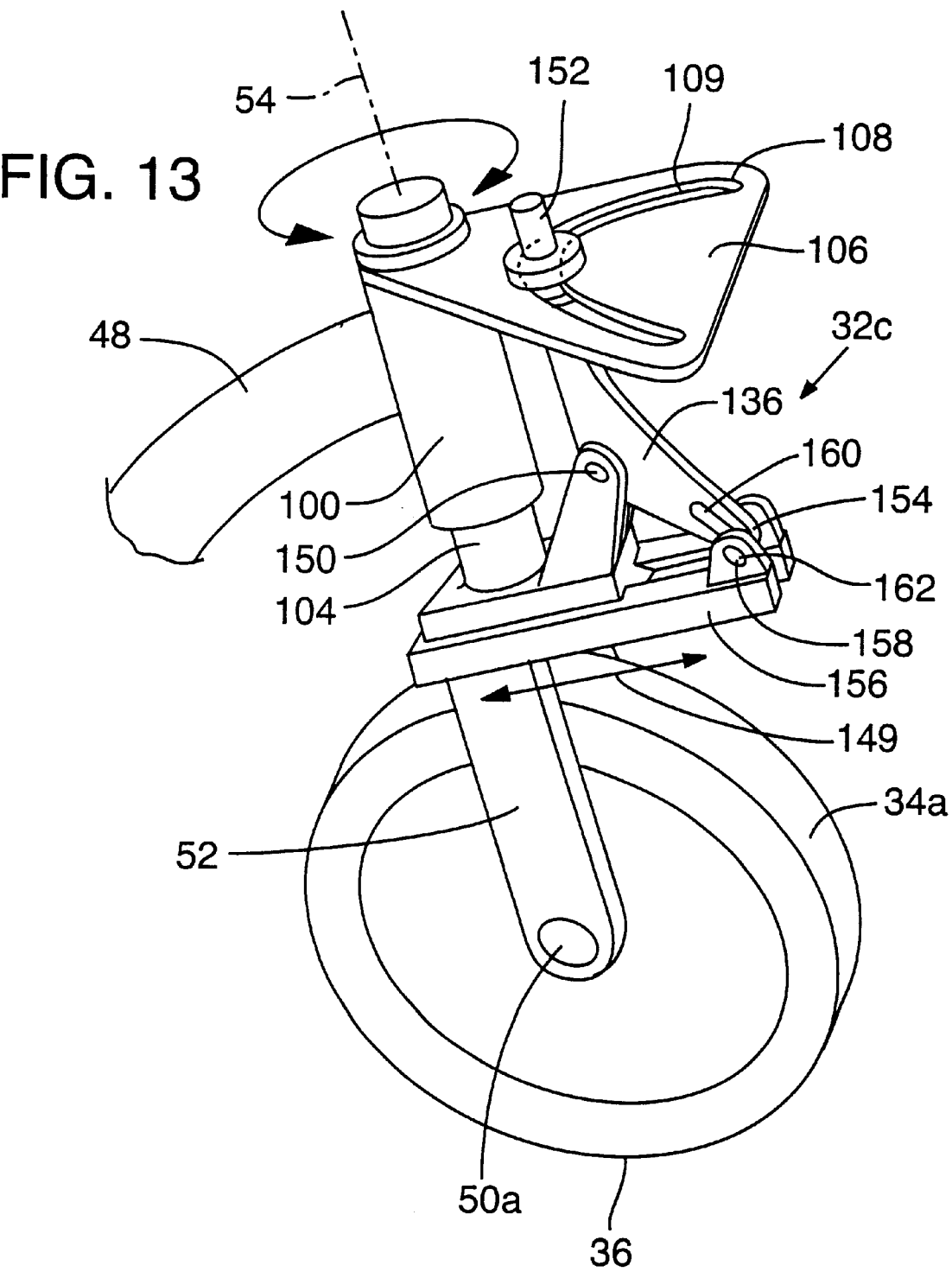
FIG. 13 is a fragmentary, isometric view of the two-wheeled vehicle of FIG. 7 with the vehicle having an in-plane, linear fork movement, dynamically-variable linkage.

Referring specifically to FIG. 13, a front steering wheel that is operably secured to the vehicle base with an in-plane linear fork movement linkage 32c is disclosed. This embodiment has substantially the same basic elements and construction of the first described embodiment. Accordingly, in order to avoid undue repetition, unless specifically identified otherwise below, reference numerals refer to like numbered elements having a like orientation and configuration as those elements identified in the discussion of the first preferred embodiment.

In this embodiment, the steering shaft 104 and fork 52 are separate structures that are slidably secured together as shown to permit the steering wheel 34a to move forward and backward in the direction of arrows 149 along the steering wheel's plane 88a relative to the base 48. This movement is preferably regulated by a guide cam 136, pivotally secured to the steering shaft 104 at pivot point 150. One end 152 of the guide cam 136 is slidably received within the guide-cam engaging portion 108 of the steering head 106. An opposite end 154 of the guide cam 136 is operably secured to the fork 52. Preferably, the steering head 106 is rigidly secured to the fork mounting portion 100 of the base 48.

Preferably, the fork 52 includes a substantially linear sliding portion 156, and the guide cam 136 is secured toward one end of that portion 156 with a pin 158. The pin 158 is received through an opening 160 in the guide cam 136. Preferably, this opening 160 is elongated, and adequate tolerance is provided at pivot point 162 to permit the cam 136 to move as described throughout the entire range of motion of the steering shaft 104.

The steering shaft 104, fork 52, guide cam 136, guide cam engaging portion 108, linear sliding portion 156 and related components are all sized and shaped such that the point of contact 36 of the steering wheel 34a is maintained within the controllability area 37 of the vehicle 30 throughout the entire range of motion of the steering shaft 104.

2. Out-of-Plane Movement

Out-of-plane movement includes a dynamically-variable linkage 32 that moves the point of contact 36 of the steering wheel 34a side-to-side with respect to the steering wheel plane 88a (FIG. 1A), such that it maintains the steering wheel's point-of-contact 36 within the optimal controllability area 37 throughout the entire range of motion of the steering wheel 34a. FIG. 6 shows the same three points-of-contact 36, 36', 36" shown in FIG. 5, but with a dynamically-variable linkage that provides out-of-plane movement throughout the previously described turn.

In particular, when the steering wheel 34a is only turned (as in FIG. 3), the out-of-plane, dynamically-variable linkage 32 urges the steering wheel in the direction of arrow 100 away from the steering wheel plane 88a such that the point-of-contact 36' is maintained in the controllability area 37. Similarly, when the vehicle 30 is simultaeneously tilted and the steering wheel is turned (as in FIG. 4), the out-of-plane, dynamically-variable linkage 32 urges the steering wheel 34a away from the steering wheel plane in the direction of arrow 98 to maintain the point of contact 36" within the controllability area 37.

Exemplar structures for providing this type of movement are discussed in greater detail below.

a. Out-Of-Plane Angular Fork Movement

Referring specifically to FIGS. 14 and 15, a front steering wheel 34a that is operably secured to the vehicle base 48 with an out-of-plane angular fork movement linkage 32d is disclosed. This embodiment has substantially the same basic elements and construction of the first described embodiment. Accordingly, in order to avoid undue repetition, unless specifically identified otherwise below, reference numerals refer to like numbered elements having a like orientation and configuration as those elements identified in the discussion of the first preferred embodiment.

In this embodiment the steering shaft 104 and fork 52 are separate structures. The steering shaft 104 is pivotally secured to the fork mounting portion 100 and includes an outward extending portion 170 that preferably extends above and forward from the fork mounting portion 100. An upper end 172 of the fork 52 is pivotally secured to the outward extending portion 170 of the steering shaft 104, preferably at an opening 174 in the fork 52.

A pivoting arm 176 extends from the fork mounting portion 100 of the base 48. As best shown in FIG. 15, the fork 52 includes a pivoting arm engaging portion 178 that straddles the pivoting arm 176. Preferably, wedge shaped portions 180 of the fork 52 operably engage the pivoting arm 176, thereby allowing the fork 52 to turn substantially about an axis 182 that is substantially parallel to steering axis 54 as shown in dashed lines in FIG. 15.

In addition, the pivoting arm 176 serves as a fulcrum for the side-to-side tilting of the fork 52. Specifically, as the steering shaft 104 rotates about steering axis 52, the outward extending portion 170 of the steering shaft 104 urges the upper end 172 of the fork 52 in a first direction. This causes the fork 52 to tilt about the pivoting arm 176, and urges the lower end 184 of the fork 52, which supports the steering wheel 34a, in an opposite second direction out-of-plane to the steering wheel's plane 88a.

The steering shaft 104, outward extending portion 170, fork 52, pivoting arm 176 and related components are all sized and shaped such that the point of contact 36 of the steering Wheel 34a is maintained within the controllability area 37 of the vehicle 30 throughout the entire range of motion of the steering shaft 104.

Figure 16:
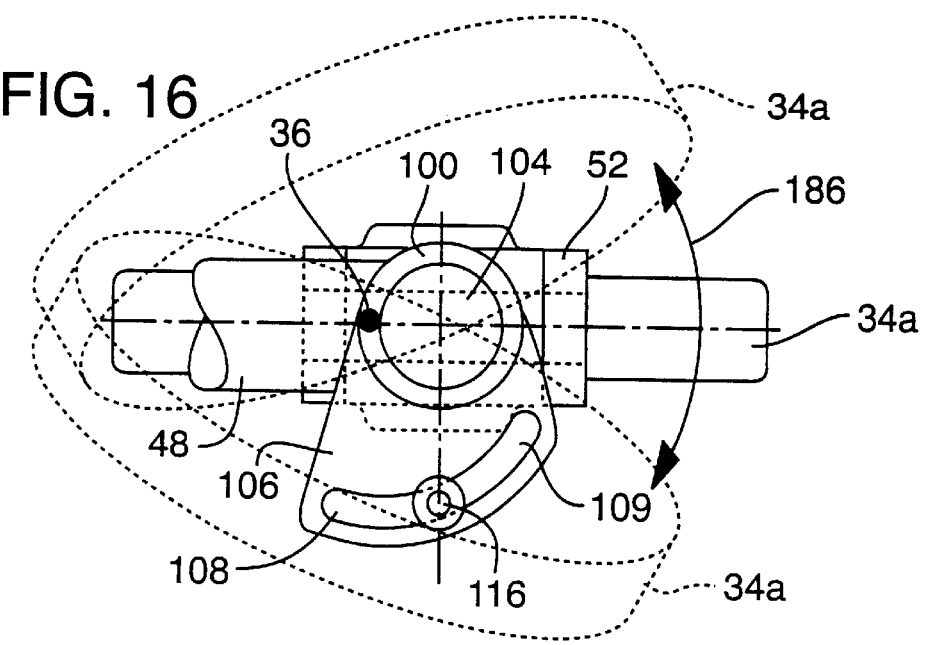
FIG. 16 is a fragmentary, top view of the two-wheeled vehicle of FIG. 6 with the vehicle having a possible alternative out-of-plane, angular fork movement, dynamically-variable linkage.
Figure 17:
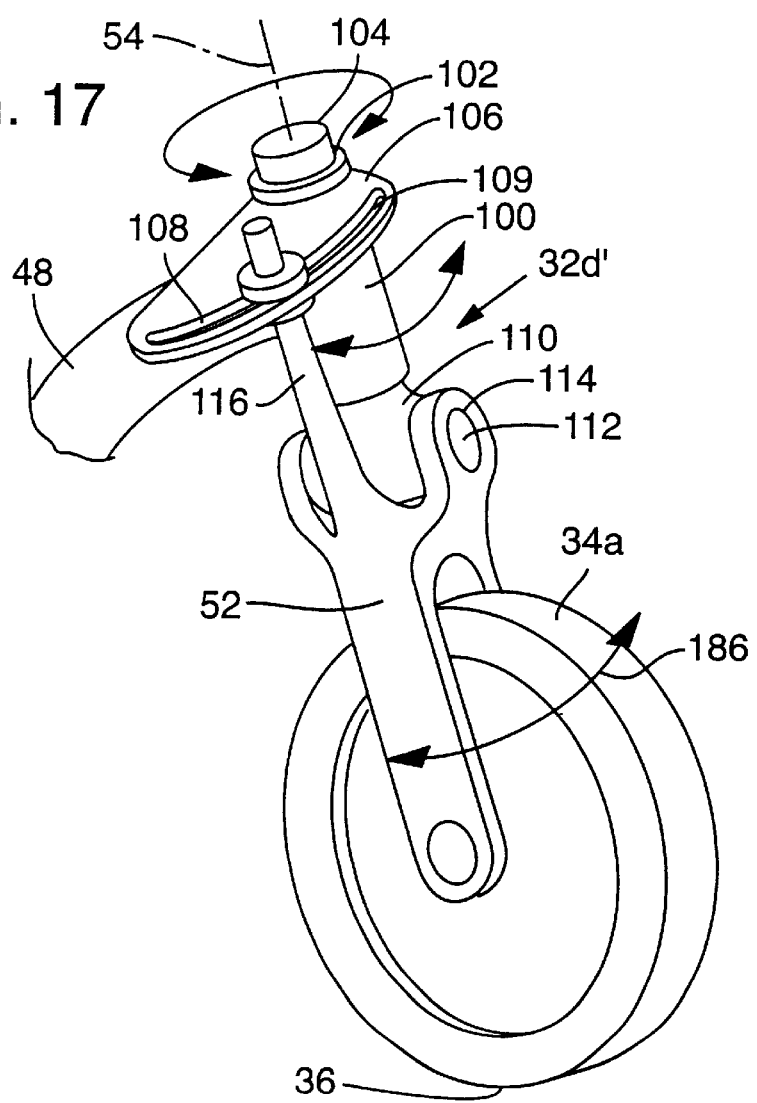
FIG. 17 is a fragmentary, isometric view of the two-wheeled vehicle of FIG. 16.

An alternative angular fork movement linkage 32d' is disclosed in FIGS. 16 and 17. This embodiment has substantially the same basic elements and construction of the first described embodiment. Accordingly, in order to avoid undue repetition, unless specifically identified otherwise below, reference numerals refer to like numbered elements having a like orientation and configuration as those elements identified in the discussion of the first preferred embodiment.

In particular, this out-of-plane, angular fork movement linkage 32d' includes a fork mounting portion 100 extending from the base 48 and defining an elongate channel 102 for pivotally receiving a steering shaft 104 therein. A steering head 106 is rigidly secured to the fork mounting portion 100 and preferably extends to one side of the fork mounting portion 100, is substantially planar, is aligned substantially parallel with the planar surface 49 (FIG. 8), and includes a guide cam engaging portion 108 as shown in FIG. 17.

The steering shaft 104 is operably secured within the channel 102 such that it pivots freely about the steering axis 54. The steering shaft 104 includes a fork engaging portion 110 for pivotally securing the fork 52. Preferably, this fork engaging portion 110 includes at least one shaft 112 extending from the fork engaging portion 110 and aligned generally longitudinally with the longitudinal length of the base 48.

The fork 52 is operably secured to the fork engaging portion 110 of the sheering shaft 104, preferably through openings 114 for receiving the shaft as shown, such that the point of contact 36 of the steering wheel 34a moves angularly about the shaft 112, side-to-side with respect to the base 48 in the direction of arrow 186, and generally perpendicular to the steering wheel's plane 88a.

The fork 52 includes a guide cam portion 116 extending therefrom for operably.engaging the guide cam engaging portion 108 of the steering head 106. Preferably, the guide cam engaging portion 108 is an elongate curved opening 109 in the steering head 106, and the guide cam portion 116 is an elongate portion slidably received within the curved opening 109.

The guide cam engaging portion 108, the guide cam portion 116, the fork 52, and other components are all sized and shaped such that the point of contact 36 of the steering wheel 34a is maintained within the controllability area 37 of the vehicle 30 through the entire range of motion of the steering shaft 104. More preferably, the cam engaging portion 108 is arcuate with its closest point to the fork mounting portion 100 being at one end of the cam engaging portion 108 as best shown in FIG. 17.

b. Out-Of-Plane Axial Fork Movement

Referring specifically to FIGS. 18 and 19, a front steering wheel 34a that is operably secured to the vehicle base 48 with an out-of-plane axial fork movement linkage 32e is disclosed. This embodiment has substantially the same basic elements and construction of the first described embodiment. Accordingly, in order to avoid undue repetition, unless specifically identified otherwise below, reference numerals refer to like numbered elements having a like orientation and configuration as those elements identified in the discussion of the first preferred embodiment.

In this embodiment, the steering shaft 104 and fork 52 are a single, monolithic structure 190 operably secured to the fork mounting portion 100 of the base 48. This structure 190 includes the wheel fork 192 extending below the fork mounting portion 100 and an outwardly extending portion 194 that preferably extends above and forward from the fork mounting portion 100.

A wheel mounting portion 132 supporting the front wheel's axle 50a is slidably secured to the end of the wheel fork 192 as shown to permit the point-of-contact 36 of the steering wheel 34a to move side-to-side relative to the steering wheel's 34a plane 88a. This movement is preferably regulated by mating sprockets 196a, 196b. More preferably, at least one elongated substantially linear, or "rack," sprocket 196a is secured to the wheel mounting portion 132, and an axial, or "pinion," sprocket 196b is secured to the wheel fork 192 for operably engaging the linear sprocket 196a as shown. More preferably, a pair of mating rack and pinion gears 196a, 196b, one on each side of the steering wheel 34a, are used.

A substantially straight, elongate, pivot arm 198 is pivotally secured to the fork mounting portion 100 at pivot point 200. An upper end 202 of the pivot arm 198 is operably secured to the outwardly extending portion 194 of the monolithic structure 190 as shown. The opposite lower end 204 of the pivot arm 198 is operably secured to control cables 206a, 206b.

The control cables 206a, 206b are secured to the pivot arm 198 as shown such that movement of the pivot arm 198 about its pivot point 200 pulls one end of the cables 206a, 206b, and loosens the other ends of those cables 206a, 206b. The cables 206a, 206b are operably secured to the axial sprockets 196b such that this movement causes the sprockets 296b to rotate about their pivot axes 208a, 208b in one direction or the other, thereby urging the linear sprockets 196a sideways, and moving the point of contact 36 of the steering wheel 34a side-to-side as described.

Preferably, the lower end 204 of the pivot arm 198 is operably secured to a slider assembly 210 as shown to maintain alignment of the pivot arm 198 with respect to the fork mounting portion 100 throughout the entire range of motion of the pivot arm 198.

The steering shaft 104, outward extending portion 194, wheel fork 192, pivot arm 198 and related components are all sized and shaped to such that the point of contact 36 of the steering wheel 34a is maintained within the controllability area 37 of the vehicle 30 throughout the entire range of motion of the steering shaft 104.

c. Out-Of-Plane Linear Fork Movement

Figure 20:
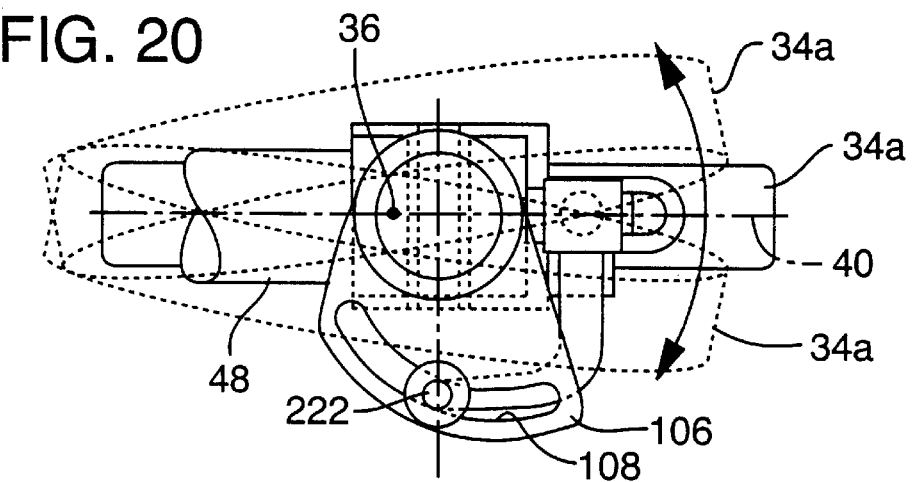
FIG. 20 a fragmentary, top view of the two-wheeled vehicle of FIG. 6 with the vehicle having an out-of-plane, axial fork movement, dynamically-variable linkage.
Figure 21:
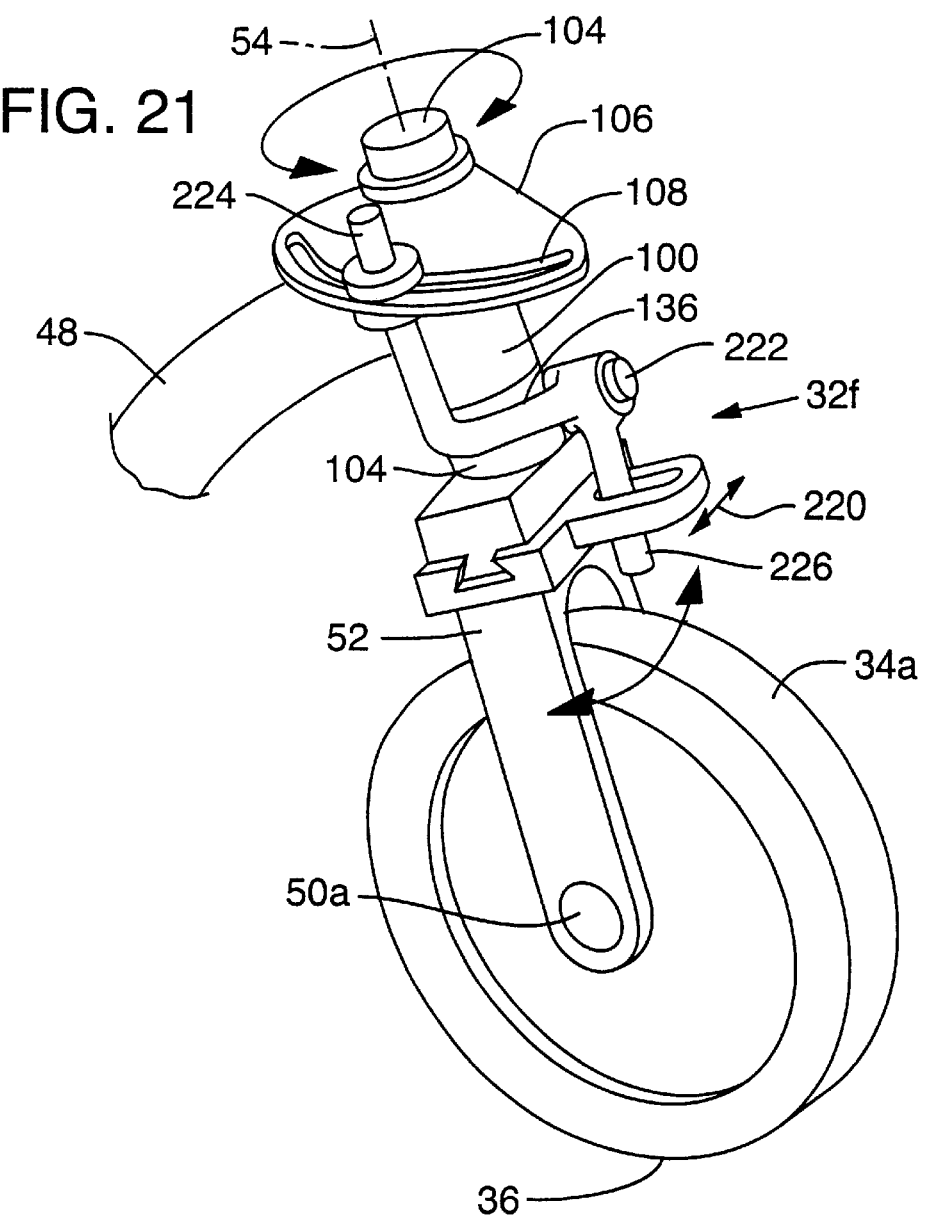
FIG. 21 is a fragmentary, isometric view of the two-wheeled vehicle of FIG. 20.

Referring specifically to FIGS. 20 and 21, a front steering wheel that is operably secured to the vehicle base with an out-of-plane linear fork movement linkage 32f is disclosed. In order to avoid undue repetition, unless specifically identified otherwise below, reference numerals refer to like numbered elements having a like orientation and configuration as those elements identified in the discussion of the first preferred embodiment.

In this embodiment, the steering shaft 104 and fork 52 are separate structures, with the steering wheel 34a mounted to the fork 52. As best shown in FIG. 21, the fork 52 is slidably secured to the steering shaft 104 such that the fork 52 and attached wheel 34a move out of plane with respect to the steering wheel's plane 88a in the direction if arrows 220.

This movement is preferably regulated by guide cam 136. More preferably, the guide cam 136 is pivotally secured to the steering shaft 104 at pivot point 222 such that the guide cam 136 pivots about pivot point 222 as one end 224 of the guide cam 136 moves along the cam-engaging portion 108 of the steering head 106. The opposite end 226 of the guide cam 136 is operably secured to the fork 52 such that rotation of the steering shaft 104 about the steering axis 54 causes the guide cam 136 to move along the cam-engaging portion 108 of the steering head 106, thereby urging the fork 52 to move sideways as described.

Preferably, the steering head 106 is rigidigly secured to the fork mounting portion 100 and extends to one side of the fork mounting portion 100, is substantially planar, and is aligned substantially parallel with the planar surface 49 (FIG. 8). More preferably, the cam engaging portion 108 is arcuate with its closest point to the fork mounting portion 100 being at one end of the cam engaging portion 108 as best shown in FIG. 21.

As best shown in FIG. 20, the guide cam 136, the cam engaging portion 108, fork 52 and related components are all sized and shaped such that the point of contact 36 of the steering wheel 34a is maintained within the controllability area 37 of the vehicle 30 throughout the entire range of motion of the steering shaft 104.

All of these exemplar linkages 32a–f operate in essentially the same way. A rider stands on the board of the base while the vehicle is moving forward. Using his sense of balance, the rider can tilt the board 49 sideways to command a turn. The previously described forces urge the steering wheel 34a to turn in the direction of the commanded turn. However, these linkages maintain the point-of-contact 36 in the controllability area 37 of the vehicle 30, thereby allowing the rider to maintain control of the vehicle throughout a wide operating range of the vehicle 30 simply by tilting the board 49.

D. Additional Features

Figure 22:
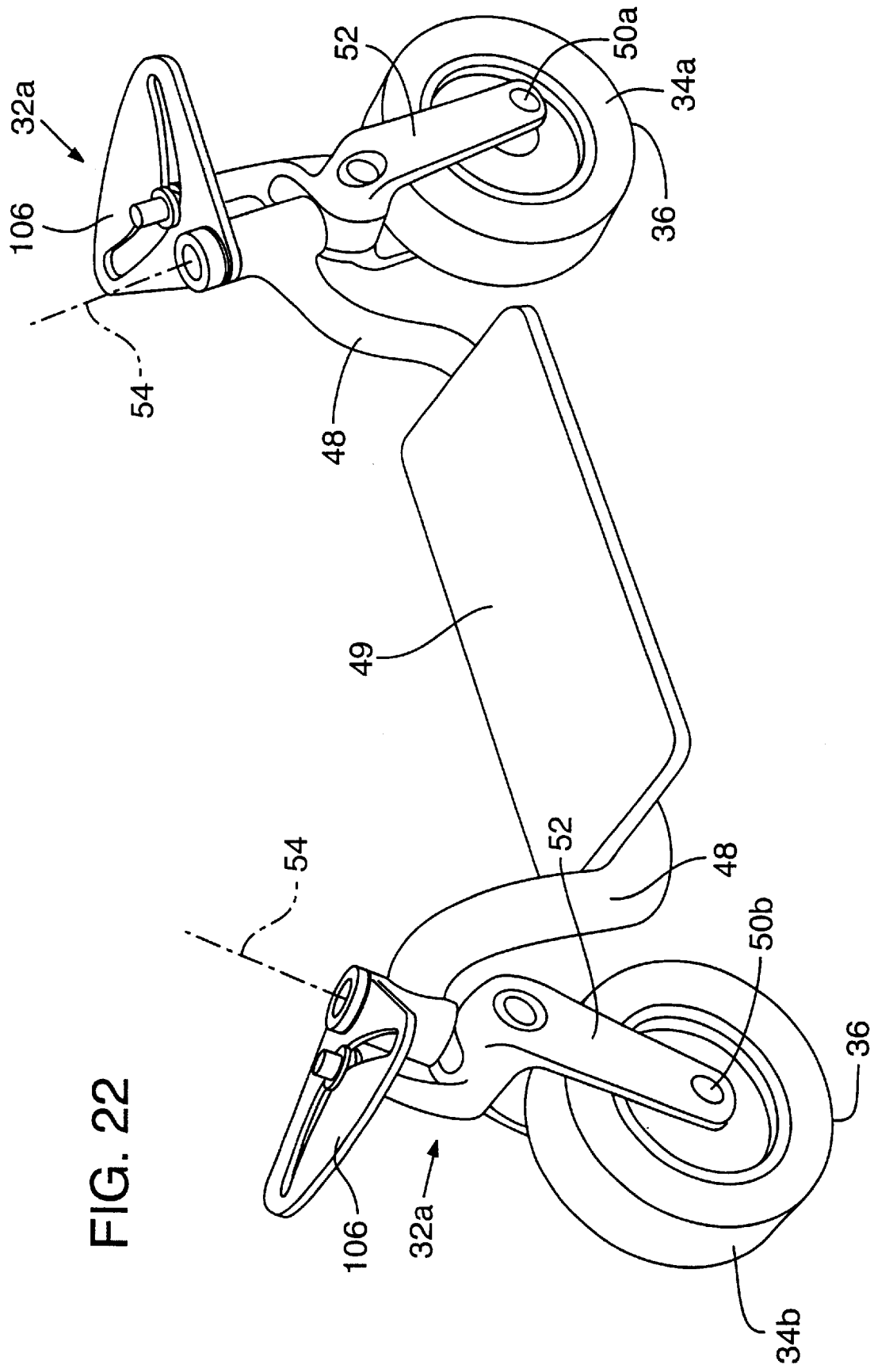
FIG. 22 is an isometric view of the two-wheeled vehicle of FIG. 7 with the vehicle having two dynamically-variable linkages in accordance with a preferred embodiment of the invention.

In view of the wide variety of embodiments to which the principles of the invention can be applied, it should be apparent that the detailed description of a preferred embodiment is illustrative only and should not be taken as limiting the scope of the invention. For example, as shown in FIG. 22, both wheels 34a, 34b can be connected to the vehicle 30' with a dynamically-variable linkage. In FIG. 22, a pair of in-plane, angular fork movement linkages 32a are shown. However, any dynamically-variable linkage could be used.

Moreover, to facilitate understanding, the presently described linkages have been described as providing either "in-plane" or "out-of-plane" movement. Obviously, any type of linkage movement, design, or structure, that maintains the point-of-contact 36 of at least one steering wheel 34a within the controllability area 37 of the vehicle can be used.

Also, the principles of the present invention work equally well whether the vehicle is self-propelled, rider-propelled, gravity propelled, or propelled by other sources, such as the wind. Accordingly, the vehicle of the present invention could readily include forms of propulsion, such as a motor, bicycle chain and peddle system, sail, or other forms of propulsion without compromising the principles of the present invention.

In addition, depending on the terrain in which the operator plans to ride the vehicle, traditional suspension linkages can also be included to offer a smoother ride to the rider without compromising the benefits of the present invention. Also, although not required to control or stabilize the vehicle, traditional handlebars, or a support bar can extend along the steering axis or from the base, to facilitate rider balance on the vehicle.

Accordingly, the claimed invention includes all such modifications as may come within the scope of the following claims and equivalents thereto.

I claim:

1. A two-wheeled vehicle for operating on a ground surface, the vehicle comprising:

a base having a generally longitudinal length defining a longitudinal center line;

a first wheel pivotally secured to said base at said longitudinal center line and having a first area of contact with the ground surface;

a second wheel pivotally secured to said base, spaced apart from said first wheel, having a second area of contact with the ground surface, and a steering axis at said longitudinal center line;

said steering axis aligned such that the second wheel can turn side-to-side relative to the base thereby steering the vehicle and defining range of motion of the second wheel that includes a straight position and a turned position of the second wheel relative to the base, said steering axis and said first area of contact defining the vehicle plane of the vehicle;

said base able to tilt generally about said center line and thereby command the second wheel into one of said straight position and said turned position from the other of said straight position and said turned position based on the direction and angle of said tilt defining straight and turning operations of the vehicle; and, a position regulator operably securing said second wheel to said base such that said second area of contact remains substantially within said vehicle plane in both said straight position and said turned position wherein dynamic balance and maneuverability of the vehicle are maintained during both said straight and said turning operations of the vehicle.

2. The two-wheeled vehicle of claim 1, wherein said vehicle has a controllability area and said second area of contact remains within the controllability area in both said straight position and said turned position.

3. The two-wheeled vehicle of claim 2, wherein said second area of contact remains within the vehicle plane in both said straight position and said turned position.

4. The two-wheeled vehicle of claim 1, wherein said base further includes a substantially planar surface.

5. The two-wheeled vehicle of claim 4, wherein said planar surface may be toggled about said longitudinal centerline to create said tilt.

6. The two-wheeled vehicle of claim 5, wherein a rider having feet stands on said planar surface and controls said vehicle by tilting said board with the rider's feet.

7. The two-wheeled vehicle of claim 6, wherein said vehicle is propelled by gravity.

8. The two-wheeled vehicle of claim 6, wherein said vehicle is self-propelled.

9. The two-wheeled vehicle of claim 1, wherein said first and second areas of contact are points of contact.

10. The two-wheeled vehicle of claim 1, wherein said first wheel has a first wheel steering axis at said longitudinal center line;

said first wheel steering axis is aligned such that the first wheel can turn side-to-side relative to the base thereby steering the vehicle and defining range of motion of the first wheel that includes a first wheel straight position and a first wheel turned position of the first wheel relative to the base;

said base able to tilt generally about said center line and thereby command the first wheel into one of said first wheel straight position and said first wheel turned position from the other of said first wheel straight position and said first wheel turned position based on the direction and angle of said tilt further defining straight and turning operations of the vehicle; and, said first wheel operably secured to said base such that said first area of contact remains substantially within said vehicle plane in both said first wheel straight position and said first wheel turned position.

11. The two-wheeled vehicle of claim 10, wherein said first and second wheels are operably secured to said base with dynamically-variable linkages.

12. The two-wheeled vehicle of claim 1, wherein said position regulator is a dynamically-variable linkage.

13. The two-wheeled vehicle of claim 12, wherein said dynamically-variable linkage includes a base mounting portion for operably securing said linkage to said base at said steering axis;

a wheel mounting portion for pivotally securing said second wheel of said wheeled vehicle such that said second wheel contacts the ground surface at said second area of contact.

14. The two-wheeled vehicle of claim 13, further including a controllability area adjacent to said vehicle plane, and wherein said position regulator maintains said second area of contact within the controllability area in both said straight position and said turned position.

15. The two-wheeled vehicle of claim 1, wherein said second wheel is operably secured to said base such that said second area of contact remains substantially within said vehicle plane throughout said range of motion of the second wheel.

16. The two-wheeled vehicle of claim 15, wherein said second area of contact remains within the vehicle plane throughout said range of motion of said second wheel.

17. A two-wheeled vehicle for operating on a ground surface, the vehicle comprising:

a base having a generally longitudinal length defining a longitudinal center line;

a first wheel pivotally secured to said base and having a first area of contact with the ground surface;

a dynamically-variable linkage pivotally securing a second wheel to said base, said second wheel having a second area of contact with the ground surface and a steering axis aligned such that the second wheel can turn side-to-side relative to the base thereby steering the vehicle and defining range of motion of the second wheel that includes a straight position and a turned position of the second wheel relative to the base;

said base able to tilt generally about said center line and thereby command the second wheel into one of said straight position and said turned position from the other of said straight position and said turned position based on the direction and angle of said tilt; and, said dynamically-variable linkage regulating the position of the second wheel with respect to the base such that the second area of contact remains within a plane defined by the steering axis and first area of contact in said straight position and said turned position.

18. The two-wheeled vehicle of claim 17, wherein:

said steering axis and said first area of contact define a vehicle plane;

further including a controllability area adjacent to said vehicle plane; and, wherein said second area of contact remains within the controllability area in both said straight position and said turned position.

19. The two-wheeled vehicle of claim 18, wherein said second area of contact remains within the controllability area throughout said range of motion of said second wheel.

20. The two-wheeled vehicle of claim 17, wherein said dynamically-variable linkage includes:

base mounting portion for operably securing said linkage to said base at said steering axis;

a wheel mounting portion for pivotally securing said second wheel of said wheeled vehicle such that the wheel contacts the ground surface at said second area of contact; and, a position regulator operably connecting said base mounting portion to said wheel mounting portion to regulate the position of said wheel mounting portion relative to said base mounting portion in response to the amount of tilt of said base.

21. The two-wheeled vehicle of claim 20, wherein said second wheel has a plane of operation, and said dynamically-variable linkage moves the second area of contact within said plane of operation to maintain the second area of contact within said plane defined by the steering axis and first area of contact.

22. The two-wheeled vehicle of claim 21, wherein said position regulator moves said wheel mounting portion angularly with respect to said base mounting portion.

23. The two-wheeled vehicle of claim 21, wherein said position regulator moves said wheel mounting portion axially with respect to said base mounting portion.

24. The two-wheeled vehicle of claim 21, wherein said position regulator moves said wheel mounting portion linearly with respect to said base mounting portion.

25. The two-wheeled vehicle of claim 20, wherein said second wheel has a plane of operation, and said dynamically-variable linkage moves the second area of contact out of said plane of operation to maintain the second area of contact within said plane defined by the steering axis and first area of contact.

26. The two-wheeled vehicle of claim 25, wherein said position regulator moves said wheel mounting portion angularly with respect to said base mounting portion.

27. The two-wheeled vehicle of claim 25, wherein said position regulator moves said wheel mounting portion axially with respect to said base mounting portion.

28. The two-wheeled vehicle of claim 25, wherein said position regulator moves said wheel mounting portion linearly with respect to said base mounting portion.

29. The two-wheeled vehicle of claim 17, further including:
   a first wheel dynamically-variable linkage pivotally securing said first wheel to said base at a second steering axis;
   said second steering axis aligned such that said first wheel can turn side-to-side relative to the base thereby steering the vehicle and defining range of motion of the first wheel that includes a first wheel straight position and a first wheel turned position;
   said base able to tilt generally about said center line and thereby command the first wheel into one of said first wheel straight position and said first wheel turned position from the other of said first wheel straight position and said first wheel turned position based on the direction and angle of said tilt; and,
   said second dynamically-variable linkage maintaining the first area of contact within a plane defined by the second steering axis and the second area of contact in said first wheel straight position and said first wheel turned position.

30. The two-wheeled vehicle of claim 29, wherein:
   said second steering axis and said first area of contact define a vehicle plane;
   further including a controllability area adjacent to said vehicle plane; and,
   wherein said first area of contact and said second area of contact remain within the controllability area in both said straight position and said turned position.

31. The two-wheeled vehicle of claim 30, wherein said first area of contact and said second area of contact remain within the controllability area throughout said range of motion of said first wheel, and said range of motion of said second wheel.

32. A dynamically-variable linkage for use on a wheel of a wheeled vehicle having a base and a steering control, said linkage comprising:
   a base mounting portion for operably securing said linkage to the base of the wheeled vehicle at a steering axis aligned such that the wheel can turn side-to-side relative to the base thereby steering the vehicle and defining a range of motion of the wheel that includes a straight position and a turned position;
   a wheel mounting portion for pivotally securing the wheel of said wheeled vehicle such that the wheel contacts a ground surface at an area of contact; and,
   a position regulator operably connecting said base mounting portion to said wheel mounting portion to regulate the position of said wheel mounting portion relative to said base mounting portion in response to the steering control such that the area of contact is maintained within a predefined plane when the wheel is in said straight position and said turned position.

33. The dynamically-variable linkage of claim 32, wherein said wheel has a plane of rotation, and said dynamically-variable linkage moves the area of contact within said plane of rotation to maintain the area of contact within said defined plane.

34. The dynamically-variable linkage of claim 33, wherein said position regulator moves said wheel mounting portion angularly with respect to said base mounting portion.

35. The dynamically-variable linkage of claim 33, wherein said position regulator moves said wheel mounting portion axially with respect to said base mounting portion.

36. The dynamically-variable linkage of claim 33, wherein said position regulator moves said wheel mounting portion linearly with respect to said base mounting portion.

37. The dynamically-variable linkage of claim 32, wherein said wheel has a plane of rotation, and said dynamically-variable linkage moves the area of contact out of said plane of rotation to maintain the area of contact within said defined plane.

38. The dynamically-variable linkage of claim 32, wherein said position regulator moves said wheel mounting portion angularly with respect to said base mounting portion.

39. The dynamically-variable linkage of claim 37, wherein said position regulator moves said wheel mounting portion axially with respect to said base mounting portion.

40. The dynamically-variable linkage of claim 37, wherein said position regulator moves said wheel mounting portion linearly with respect to said base mounting portion.

* * * * *